US008149914B2

(12) United States Patent
Shimauchi et al.

(10) Patent No.: US 8,149,914 B2
(45) Date of Patent: Apr. 3, 2012

(54) VIDEO-SIGNAL LAYERED CODING AND DECODING METHODS, APPARATUSES, AND PROGRAMS

(75) Inventors: Kazuhiro Shimauchi, Yokohama (JP); Satoru Sakazume, Yokohama (JP); Toru Kumakura, Yokohama (JP); Motoharu Ueda, Yokohama (JP)

(73) Assignee: Victor Company of Japan, Ltd.,, Yokohama-Shi (JP)

( * ) Notice: Subject to any disclaimer, the term of this patent is extended or adjusted under 35 U.S.C. 154(b) by 1504 days.

(21) Appl. No.: 11/613,978

(22) Filed: Dec. 20, 2006

(65) Prior Publication Data

US 2007/0147494 A1    Jun. 28, 2007

(30) Foreign Application Priority Data

Dec. 22, 2005   (JP) ................................ 2005-369544

(51) Int. Cl.
*H04N 7/12* (2006.01)
(52) U.S. Cl. ................................. 375/240.16
(58) Field of Classification Search .................. 345/660, 345/667; 348/441–452, 581; 375/240.01–240.29; 382/248
See application file for complete search history.

(56) References Cited

U.S. PATENT DOCUMENTS

| | | | | |
|---|---|---|---|---|
| 6,005,623 A * | 12/1999 | Takahashi et al. | ....... | 375/240.16 |
| 2005/0105814 A1 * | 5/2005 | Bruls et al. | ..................... | 382/240 |
| 2007/0160126 A1 * | 7/2007 | Van Der Meer et al. | ...... | 375/240 |
| 2008/0304567 A1 * | 12/2008 | Boyce et al. | ............. | 375/240.16 |

FOREIGN PATENT DOCUMENTS

| | | |
|---|---|---|
| EP | 0644695 A2 | 3/2002 |
| JP | 06-205397 | 7/1994 |
| WO | W003036980 A1 | 5/2003 |

OTHER PUBLICATIONS

"An Arbitrary Scale Image Enlargement Method with the Prediction of High-Frequency Components", Yasumasa Takahashi and Akira Taguchi, The Institute of Electronics, Information and Communicaton Engineers, vol. J84-A, No. 9, pp. 1192-1201, Sep. 2001. English translation of Abstract provided.
"Image Enhancement by Nonlinear Extrapolation in Frequency Space", Hayit Greenspan, Charles H. Anderson, and Sofia Akber, IEEE Transactions on Image Processing, vol. 9, No. 6, pp. 1035-1048, Jun. 2000.
"Improved Prediction and Transform for Spatial Scalability", G. Rath, C. Guillemot, W. Yang, V. Bottreau, JVT (Joint Video Team) 20th Meeting, Klagenfurt, Austria, JVT-T082, Jul. 15-21, 2006. Presentation slides and article.
Office Action dated Nov. 13, 2009, in corresponding Japanese application No. 2005-269544.

* cited by examiner

*Primary Examiner* — Thai Tran
*Assistant Examiner* — Stephen Smith
(74) *Attorney, Agent, or Firm* — Jeffer Mangels Butler & Mitchell LLP

(57) ABSTRACT

A video signal is encoded at a plurality of coding layers exhibiting different spatial resolutions. An input video signal is spatially scaled down into a resolution-lowered video signal that exhibits a resolution lower than the video signal. The resolution-lowered video signal is encoded with a decoding procedure to obtain first coded data and a decoded signal. The decoded signal is spatially scaled up through a high-resolution procedure with reference to the input video signal so that the decoded signal has a smaller error with respect to the input video signal, to obtain a high-resolution scaled-up video signal. The input video signal is encoded through inter-spatial resolution prediction using the high-resolution scaled-up video signal as a predictive signal, to obtain second coded data that exhibits a resolution higher than the resolution-lowered video signal.

6 Claims, 14 Drawing Sheets

VIDEO-SIGNAL LAYERED CODING AND DECODING METHODS, APPARATUSES, AND PROGRAMS

CROSS-REFERENCE TO RELATED APPLICATIONS

This application is based on and claims the benefit of priority from the prior Japanese Patent Application No. 2005-369544 filed on Dec. 22, 2005, the entire content of which is incorporated herein by reference.

BACKGROUND OF THE INVENTION

The present invention relates to video-signal layered coding and decoding methods, apparatuses, and programs.

Several spatial- and temporal resolution and SNR (Signal-to-Noise) scalable video coding schemes have been proposed and employed in a variety of fields. In particular, spatial-domain resolution scalable video coding schemes are most applicable to still and moving pictures.

A spatial-resolution scalable layered video coding scheme produces interlayer predictive signals for use in coding enhancement layers that exhibit higher spatial resolutions than base layers also to be coded. The interlayer predictive signals are produced through interpolation of base-layer decoded signals.

In this coding scheme, an interlayer predictive signal is produced based on a correlation between an input enhancement-layer video signal and a base-layer signal. This interlayer correlation means that the base-layer signal carries some frequency components of the input enhancement-layer video signal, which further means that higher coding efficiency is achieved with higher correlation between the input enhancement-layer video signal and a base-layer decoded signal. Higher coding efficiency could be achieved with an interlayer predictive signal which is produced with an estimation procedure to give higher resolution to the base-layer decoded signal so that the input enhancement-layer video signal and the base-layer decoded signal have higher correlation, not produced with mere interpolation of the base-layer decoded signal.

When image enlargement is required, there is an image enlargement method for natural images with estimation of high-frequency components for higher resolution to an enlarged image, based on Laplacian pyramid in layered coding. Higher interlayer Laplacian-components correlation achieves prediction of Laplacian-components having spatial resolution of a coding layer from only a signal of a coding layer one layer lower than the former layer.

The above image enlargement method causes several problems if it is directly applied to the estimation procedure in layered coding discussed above, because it is for natural images. A base-layer decoded signal is a coarse signal with few components of high-frequency components that are carried by an input enhancement-layer video signal. Moreover, coarse quantization gives lower correlation between the base-layer decoded signal and the input enhancement-layer video signal. The above image enlargement method thus does not assure desired high coding efficiency if it is directly applied to the estimation procedure in layered coding, discussed above, with estimation of high-frequency components from a given low-resolution signal only.

SUMMARY OF THE INVENTION

A purpose of the present invention is to provide layered coding and decoding methods, apparatuses, and programs, with higher-resolution predictive signals.

The present invention provides a video-signal layered coding apparatus for encoding an input video signal at a plurality of coding layers exhibiting different spatial resolutions, the apparatus comprising at each coding layer: a spatial down-scaler to spatially scale down an input video signal into a resolution-lowered video signal that exhibits a resolution lower than the video signal; a first encoder to encode the resolution-lowered video signal with a decoding procedure, thus obtaining first coded data and a decoded signal; a spatial up-scaler to spatially scale up the decoded signal through a high-resolution procedure with reference to the input video signal so that the decoded signal has a smaller error with respect to the input video signal, thus obtaining a high-resolution scaled-up video signal; and a second encoder to encode the input video signal through inter-spatial resolution prediction using the high-resolution scaled-up video signal as a predictive signal, thus obtaining second coded data that exhibits a resolution higher than the resolution-lowered video signal.

Moreover, the present invention provides a video-signal layered decoding apparatus for decoding an input bitsteam at a plurality of decoding layers exhibiting different spatial resolutions, the apparatus comprising at each decoding layer: a separator to separate an input bitsteam into first coded data, second coded data and coded parameters, the first coded data being an encoded version of a resolution-lowered video signal exhibiting a resolution lower than an original video signal and obtained by spatially scaling down the original video signal, the second coded data being an encoded version of the original video signal obtained through inter-spatial resolution prediction using a high-resolution scaled-up video signal as a predictive signal and exhibiting a resolution higher than the resolution-lowered video signal, the high-resolution scaled-up video signal being obtained by spatially scaling up a decoded signal through a high-resolution procedure with reference to the original video signal so that the decoded signal has a smaller error with respect to the original video signal, the decoded signal being obtained through a decoding procedure to the resolution-lowered video signal, and the parameters thus coded being used for the high-resolution procedure; a first decoder to decode the separated first coded data to obtain the resolution-lowered video signal; a reconstructor to decode the separated coded parameters to gain the parameters used for the high-resolution procedure and spatially scale up the resolution-lowered video signal obtained by decoding the separated first data to reconstruct the high-resolution scaled-up video signal using the gained parameters; and a second decoder to decode the separated second coded data through inter-spatial resolution prediction using the reconstructed high-resolution scaled-up video signal as a predictive signal, thus obtaining a reproduced video signal of the same high resolution as the input original video signal.

DETAILED DESCRIPTION OF PREFERRED EMBODIMENTS

Several preferred embodiments according to the present invention will be described in detail with reference to the drawings.

The same reference signs and numerals are used for the same or analogous components through the drawings in the following disclosure.

There are two basic aspects of the present invention: higher prediction efficiency by estimation in layered coding or decoding; and higher correlation between an input original video signal (used as learning data) and one or more base-layer decoded signals of lower resolution than the input original video signal, which are gained through dividing the input original video signal into multiple layers of different levels of resolution and encoding thereof.

The following embodiments focus on two-layer coding or decoding. The present invention is, however, applicable to multilayer coding or decoding at a plurality of coding or decoding layers exhibiting different spatial resolutions.

Figure 1:
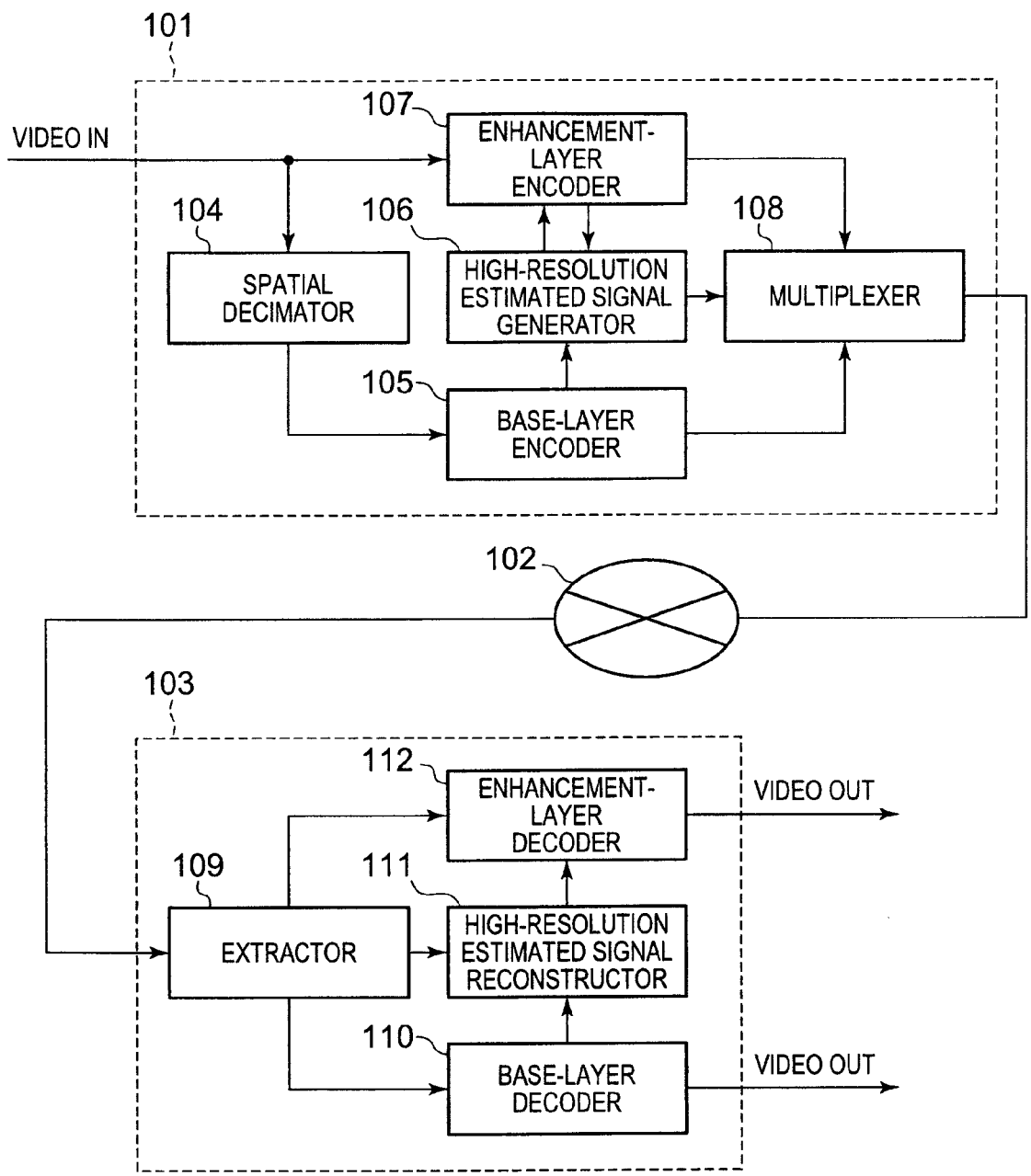
FIG. 1 shows block diagrams of a layered coding apparatus and a layered decoding apparatus according to the present invention.

Shown in FIG. 1 are block diagrams of a layered coding apparatus 101 and a layered decoding apparatus 103, for achieving higher spatial resolution scalability.

The layered coding apparatus 101 is electrically connected to the layered decoding apparatus 103 via a transfer cable or other media 102. Input to the layered coding apparatus 101 is a video signal. The video signal is subjected to a coding procedure at the coding apparatus 101. The video signal input to the coding apparatus 101 and subjected to the coding procedure is referred to as an input original video signal hereinafter.

Output from the layered coding apparatus 101 is a bitstream which is then supplied to the layered decoding apparatus 103 via the transfer cable or media 102. Data necessary for a decoding procedure are extracted from the bitstream and subjected to the decoding procedure at the decoding apparatus 103. A decoded video signal is output from the apparatus 103 at a spatial resolution suitable for a display apparatus (not shown).

Not only from the layered coding apparatus 101, the layered decoding apparatus 103 can receive bitstreams from any source.

The layered coding apparatus 101 is equipped with, at least, a spatial decimator 104 (a spatial down-scaler), a base-layer encoder (a first encoder) 105, a high-resolution estimated signal generator (a spatial up-scaler) 106, an enhancement-layer encoder (a second encoder) 107, and a multiplexer 108.

The spatial decimator 104 receives an input original video signal and spatially decimates it at a desired lower spatial resolution, thus producing a base-layer signal decimated at the desired lower spatial resolution (a resolution-lowered video signal). Although there are several ways of spatial decimation, a recommended is compatible with filtering performed at the high-resolution estimated signal generator 106, based on Laplacian pyramid, which will be discussed later, and with arbitrary down scalability. The base-layer signal is then supplied to the base-layer encoder 105.

The base-layer encoder 105 encodes the base-layer signal, thus generating a bitstream (first coded data) which is then supplied to the multiplexer 108. The base-layer encoder 105 may be an MPEG-2 or H.264 closed-loop encoder. Such an encoder may have a function of temporal scalability, S/N-ratio scalability, etc. When an open-loop encoder is employed, however, it has a function of decoding (reconstruction). The base-layer encoder 105 also generates a base-layer decoded signal which is supplied to the high-resolution estimated signal generator 106.

The high-resolution estimated signal generator 106 receives the base-layer decoded signal from the base-layer encoder 105 and also the input original video signal (as a reference signal) via the enhancement-layer encoder 107. The generator 106 has a function of estimating a video signal of the same high resolution as the input original video signal, from the base-layer decoded signal, using estimation parameters, thus producing a high-resolution estimated signal (a high-resolution scaled-up signal), and encoding the parameters. The estimation (a high-resolution procedure) will be described later in detail. The estimated signal and the coded estimation parameters are then supplied to the enhancement-layer encoder 107 and the multiplexer 108, respectively.

The enhancement-layer encoder 107 receives the input original video signal and the high-resolution estimated signal. The encoder 107 performs prediction using these signals based on correlation in space (intra prediction), inter-spatial resolution and temporal, and encodes a resultant predictive error signal, thus producing a bitstream (second coded data). These procedures will be described later in detail. The bitstream and the input original video signal are then supplied to the multiplexer 108 and the high-resolution estimated signal generator 106, respectively.

The multiplexer 108 receives the bitstreams from the base-layer encoder 105, the high-resolution estimated signal generator 106 and the enhancement-layer encoder 107 and also the coded estimation parameters from the generator 106, and multiplexes them into a multiplexed bitstream. The multiplexed bitstream is output, for example, to the transfer cable or other media 102.

Disclosed next is the layered decoding apparatus 103 shown in FIG. 1. The apparatus 103 is equipped with, at least, an extractor (a separator) 109, a base-layer decoder (a first decoder) 110, a high-resolution estimated signal reconstructor 111, and an enhancement-layer decoder 112 (a second decoder).

The extractor 109 receives the multiplexed bistream output from the layered coding apparatus 101 via the transfer cable or media 102. Not only from the apparatus 101, the layered decoding apparatus 103 can receive bitstreams from any source. The extractor 109 demultiplexes the multiplexed bistream, extracts a base-layer bitstream (first coded data) and other bitstreams (second coded data, coded parameters, etc.) depending on the performance of the apparatus 103 or a display apparatus (not shown), and outputs the bitstreams to the base-layer decoder 110, the high-resolution estimated signal reconstructor 111, and the enhancement-layer decoder 112, respectively.

The base-layer decoder 110 decodes the base-layer bitstream (first coded data) supplied from the extractor 109, thus generating a base-layer decoded signal. The base-layer decoded video signal is then supplied to the high-resolution estimated signal reconstructor 111 and, if necessary, to a display apparatus (not shown). The base-layer decoder 110 may be an MPEG-2- or H.264-type decoder. It may also have a function of temporal scalability, S/N-ratio scalability, etc.

The high-resolution estimated signal reconstructor 111 receives the base-layer decoded signal and the bitstream supplied from the base-layer decoder 110 and the extractor 109, respectively. The reconstructor 111 decodes the bitstream to gain the parameters for use in reconstruction of the high-resolution estimated signal. Then, the reconstructor 111 reconstructs the high-resolution estimated signal from the base-layer decoded signal by using the parameters. The procedure will be described later in detail. The reconstructed high-resolution estimated signal is then supplied to the enhancement-layer decoder 112.

The enhancement-layer decoder 112 receives the bitstream (second coded data) and the high-resolution estimated signal supplied from the extractor 109 and the high-resolution estimated signal reconstructor 111, respectively. The decoder 112 decodes the bitstream to gain a decoded signal and reproduce a video signal of the same high resolution as the input original video signal by using the decoded signal and the high-resolution estimated signal. The reproduced video signal is then supplied to a display apparatus or the like.

Figure 2:
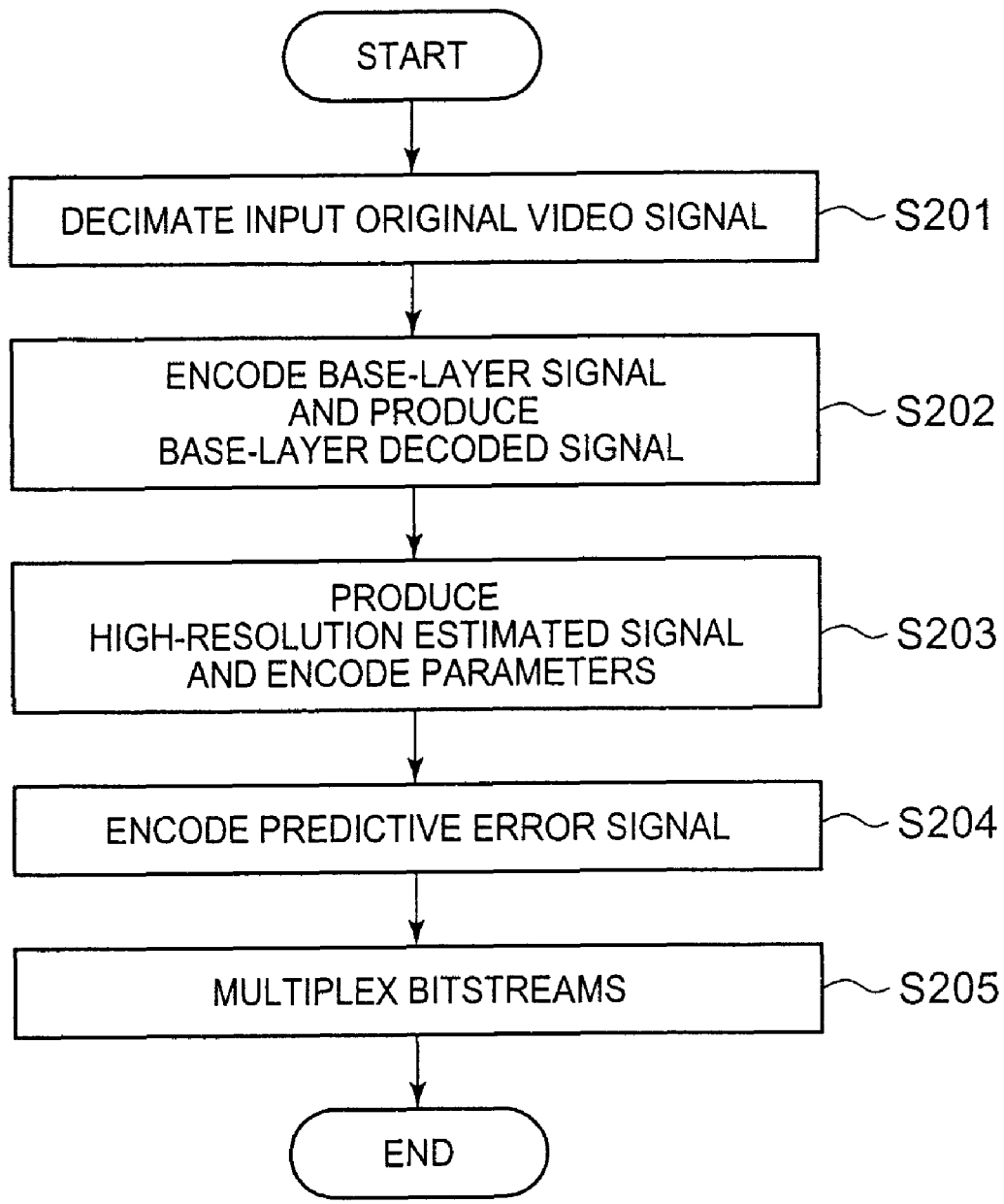
FIG. 2 shows a flowchart of a layered coding procedure that corresponds to the functions of the layered coding apparatus shown in FIG. 1.

Described next with reference to FIG. 2 is a layered coding procedure for achieving higher spatial resolution scalability that corresponds to the several functions of the layered coding apparatus 101 shown in FIG. 1.

An input original video signal is spatially decimated at a desired lower spatial resolution to produce a base-layer signal decimated at the desired lower spatial resolution (step S201). The base-layer signal is encoded to produce a bitstream, and also decoded to produce a base-layer decoded signal (step S202).

A video signal of the same high resolution as the input original video signal is estimated from the base-layer decoded signal, using estimation parameters, to produce a high-resolution estimated signal, while the parameters are encoded (step S203).

Prediction is performed using the input original video signal and the high-resolution estimated signal based on correlation in spatial resolution and temporal and a resultant predictive error signal is encoded to produce a bitstream (step S204).

The bitstreams and also the coded estimation parameters are multiplexed into a multiplexed bitstream (step S205).

Figure 3:
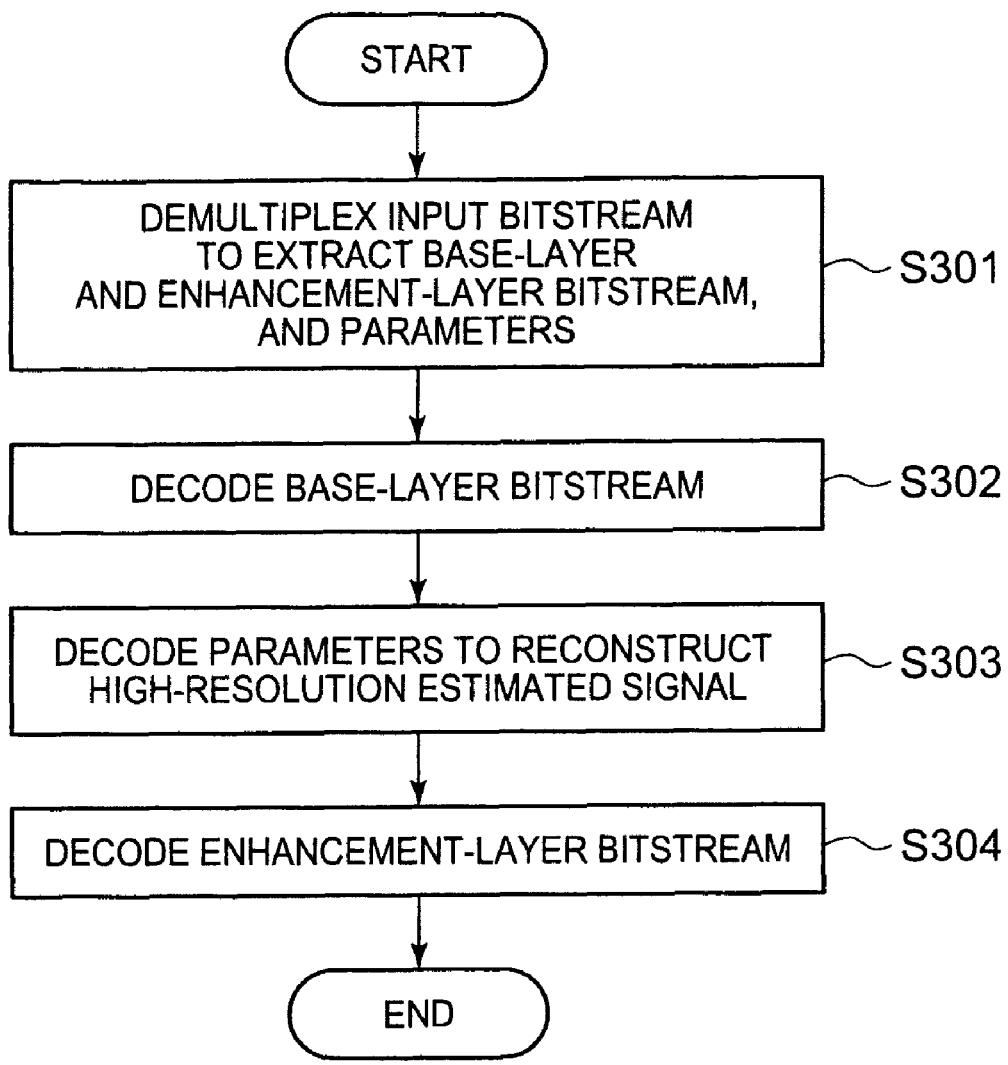
FIG. 3 shows a flowchart of a layered decoding procedure that corresponds to the functions of the layered decoding apparatus shown in FIG. 1.

Described next with reference to FIG. 3 is a layered decoding procedure for achieving higher spatial resolution scalability that corresponds to the several functions of the layered decoding apparatus 103 shown in FIG. 1.

A multiplexed bistream produced as above is demultiplexed to extract a base-layer bitstream, an enhancement-layer bitstream, and parameters for use in reconstruction of a high-resolution estimated signal (step S301).

The base-layer bitstream is decoded to produce a base-layer decoded signal (step S302). The parameters are decoded and then the high-resolution estimated signal is reconstructed from the base-layer decoded signal by using the decoded parameters (step S303).

The enhancement-layer bitstream is decoded to gain a decoded signal and reproduce a video signal of the same high resolution as the input original video signal by using the decoded signal and the high-resolution estimated signal (step S304).

Figure 4:
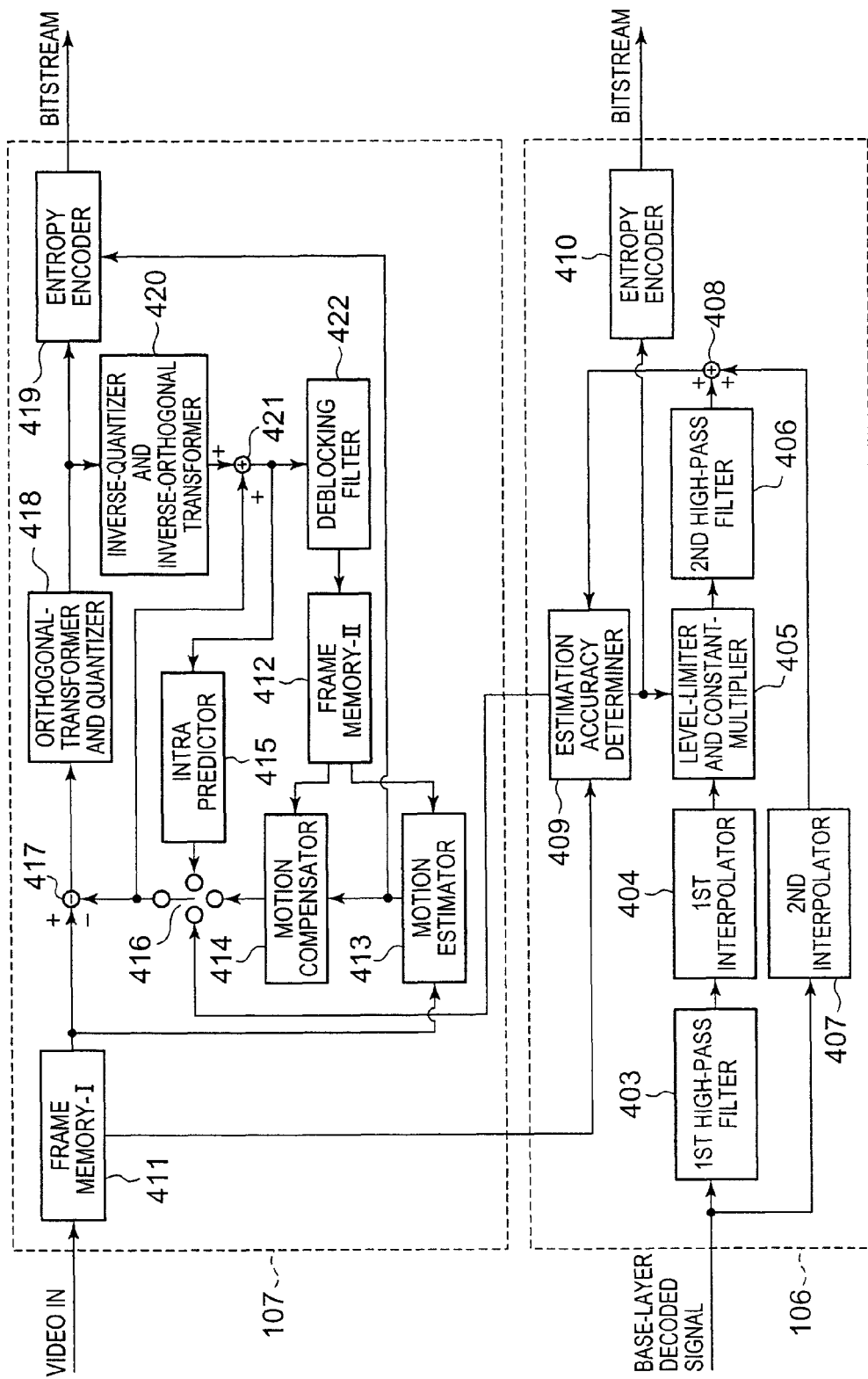
FIG. 4 shows block diagrams of a high-resolution estimated signal generator and an enhancement-layer encoder of the layered coding apparatus shown in FIG. 1.

FIG. 4 shows exemplary block diagrams of the high-resolution estimated signal generator 106 and the enhancement-layer encoder 107 of the layered coding apparatus 101.

The high-resolution estimated signal generator 106 is equipped with, at least, a first high-pass filter 403, a first interpolator 404, a level-limiter and constant-multiplier 405, a second high-pass filter 406, a second interpolator 407, a signal composer 408, an estimation accuracy determiner 409, and an entropy encoder 410.

The first high-pass filter 403 receives the base-layer decoded signal supplied from the base-layer encoder 105 (FIG. 1) and extracts high-frequency components, for example, according to the following expressions (1) and (2):

$$L_o(x) = G_o(x) - \sum_{i=-l}^{l} W(i) \cdot G_o(x+i) \tag{1}$$

$$W(i) = \frac{1}{2\sqrt{\rho\pi}} e^{-\frac{i^2}{4\rho}} \tag{2}$$

The letters "l" and "p" in the expressions (1) and (2) are the number of filter taps and a parameter for use in adjustments to a bandwidth of a Gaussion filter, respectively.

One preferable requirement for the first high-pass filter 403 is that the filter coefficients and interpolation function, etc., of the filter 403 satisfy the pyramid structure with those of the spatial decimator 104 (FIG. 1), the first interpolator 404, the second high-pass filter 406, and the second interpolator 407. The pyramid structure is achieved, for example, with the expression (2), or sinc function, etc., for the spatial decimator 104, the first interpolator 404, the second high-pass filter 406, and the second interpolator 407.

The high-frequency components extracted by the first high-pass filter 403 is then supplied to the first interpolator 404. The interpolator 404 applies an interpolation procedure to the extracted high-frequency components so that the high-frequency components exhibit resolution the same as the input original video signal, for example, according to the following expressions (3), (4) and (5):

$$(\text{EXPAND})_r L_o(x) = \sum_{i=-l}^{l} w_r(i) L_o\left(int\left(\frac{x}{2^r}\right) + i\right) \tag{3}$$

-continued $$W_r(i) = \frac{3}{4} e^{-\frac{9\pi}{16}(\Delta k + i)^2} \quad (4)$$

$$\Delta k = int\left(\frac{x}{2r}\right) - \frac{x}{2r} \quad (5)$$

The letter "I" in the expression (3) is the number of filter taps. The sign "int(.)" in the expressions (3) and (5) indicates an integer extraction procedure. The filter coefficients and interpolation function, etc., may be different from those in the expressions (3) to (5).

The interpolated signal is supplied from the first interpolator 404 to the level-limiter and constant-multiplier 405. Also supplied to the limiter and multiplier 405 are parameters from the estimation accuracy determiner 409, which will be described later.

The limiter and multiplier 405 performs a level-limiting and constant-multiplication procedure that is a first step of estimating unknown high-frequency components according to the following expression:

$$\bar{L}_r(x) = \alpha_r \times \begin{cases} T & \text{if } T \leq (\text{EXPAND})_r L_o(x) \\ (\text{EXPAND})_r L_o(x) & \text{if } -T < (\text{EXPAND})_r L_o(x) < T \\ -T & \text{if } (\text{EXPAND})_r L_o(x) \leq -T \end{cases} \quad (6)$$

The expressions (1) to (6) are taught from the description of the document "An Arbitrary Scale Image Enlargement Method with the Prediction of High-Frequency Components" published by the Institute of Electronics, Information and Communication Engineers, Vol. J84-A, No. 9, pp. 1192-1201, September 2001, the entire content of which is incorporated herein by reference. Those expressions are also taught from the description of the document "Image Enhancement By Nonlinear Extrapolation in Frequency Space" published in IEEE Transactions on Image Processing, Vol. 9, No. 6, June 2000, the entire content of which is incorporated herein by reference.

Experimentally obtained values shown in the document can be used as the parameters T and $\alpha_r$ for the level limitation and constant multiplication, respectively, in the expression (6). These parameters may, however, be externally given to the level-limiter and constant-multiplier 405 so that optimum parameters can be given for higher estimation accuracy which depends on the degree of base-layer quantization and enlargement scale.

A level-limited and constant-multiplied signal is supplied from the level-limiter and constant-multiplier 405 to the second high-pass filter 406. The filter 406 performs a high-pass filtering procedure that is a second step of estimating unknown high-frequency components, for example, according to the following expression:

$$\hat{L}_r(x) = \bar{L}_r(x) - \sum_{i=-I}^{I} W(i) \cdot \bar{L}_r(x + i) \quad (7)$$

The term W(i) in the expression (7) is given from the expression (2). The expression (7) is also taught from the teaching of the document mentioned above.

The second high-pass filter 406 supplies estimated high-frequency components to the signal composer 408.

In FIG. 4, the base-layer decoded signal supplied from the base-layer encoder 105 (FIG. 1) is given not only to the first high-pass filter 403 but also to the second interpolator 407. The interpolator 407 applies an interpolation procedure to the base-layer decoded signal so that the signal exhibits resolution the same as the input original video signal, for example, according to the following expression:

$$(\text{EXPAND})_r G_0(x) = \sum_{i=-I}^{I} W_r(i) \cdot G_0\left(int\left(\frac{x}{2r}\right) + i\right) \quad (8)$$

The term $W_r(i)$ in the expression (8) is given from the expressions (3) and (4). The filter coefficients and interpolation function, etc., may be different from those in the expression (8).

The second interpolator 406 supplies an interpolated signal to the signal composer 408.

The signal composer 408 combines the estimated high-frequency components from the second high-pass filter 406 and the interpolated signal from the second interpolator 406 to gain a high-resolution estimated signal. The high-resolution estimated signal is then supplied to the estimation accuracy determiner 409.

The estimation accuracy determiner 409 receives the high-resolution estimated signal and also the input original video signal from a frame memory-I 411 of the enhancement-layer encoder 107. The frame memory-I 411 will be described later. The signal supplied from the signal composer 408 is the high-resolution signal estimated at the level-limiter and constant-multiplier 405 using given parameters.

The estimation accuracy determiner 409 quantifies the correlation between the high-resolution estimated signal and the input original video signal and stores the quantified correlation data. The quantification may be calculation of cross-correlation between the two signals or mean square of the difference between the two signals. The determiner 409 updates the parameters used at the level-limiter and constant-multiplier 405 within a given parameter range, to gain the parameters $\alpha_r$ and T (or $\alpha_r$ only) which give higher correlation between the two signals.

The estimation accuracy determiner 409 examines plural pieces of stored quantified correlation data between the input original video signal and high-resolution estimated signals generated with updated parameters. The determiner 409 determines the best parameters that give the highest correlation, the best parameters being sent to the entropy encoder 410 and encoded. The encoder 410 encodes the best parameters into an output bitstream. The best parameters may be encoded per block. Or, one best parameter may be encoded for each one GOP (Group of Pictures), which one best parameter is an average in each one GOP for use in generation of a high-resolution estimated signal. In other words, the number of the best parameter to be coded and coding timing are not limited in the present invention.

The high-resolution estimated signal at the best parameters is supplied to a predictive-signal selector 416 of the enhancement-layer encoder 416. The predictive-signal selector 416 will be described later.

In FIG. 4, the enhancement-layer encoder 107 is equipped with, at least, the frame memory-I 411, a frame memory-II 412, a motion estimator 413, a motion compensator 414, an intra predictor 415, the predictive-signal selector 416, a predictive-error signal generator 417, an orthogonal-transformer and quantizer 418, an entropy encoder 419, an inverse-quantizer and inverse-orthogonal transformer 420, a signal composer 421, and a deblocking filter 422. The encoder 107 shown in FIG. 4 is a variation of an H.264-encoder, each unit being achieved with known circuitry.

The frame memory-I 411 receives the input original video signal and stores at least a signal portion corresponding to one GOP, the stored signal portion being supplied to the predictive-error signal generator 417, the motion estimator 413, and the estimation accuracy determiner 409 (the high-resolution estimated signal generator 106). In other words, the frame memory-I 411 outputs frame signals corresponding to one GOP so that the enhancement-layer encoder 107 and the high-resolution estimated signal generator 106 can work synchronously with each other.

On the other hand, the frame memory-II 411 receives an output signal of the deblocking filter 422 and stores at least a signal portion corresponding to one GOP. Then, the frame memory-II 411 supplies a frame signal for motion estimation to the motion estimator 413 and another frame signal for motion compensation to the motion compensator 414.

The intra predictor 415 receives an output signal (a decoded signal) of the signal composer 421 and performs intra prediction, for example, H.264 intra prediction. An intra-predicted signal is then supplied to the predictive-signal selector 416.

The motion estimator 413 receives output signals of the frame memory-I 411 and the frame memory-II 412 and performs motion estimation, for example, H.264 motion estimation. Information on motion gained by motion estimation is supplied to the motion compensator 414 and the entropy encoder 419.

The motion compensator 414 receives the frame signal from the frame memory-II 411 and the motion information from the motion estimator 413. The compensator 414 performs motion compensation, for example, H.264 motion compensation. A motion-compensated signal is then supplied to the predictive-signal selector 416. Also supplied to the selector 416 is the high-resolution estimated signal generated by the high-resolution estimated signal generator 106, as already described.

The motion estimator 413 and the motion compensator 414 work together to perform a motion-estimation and motion-compensation procedure, or a motion-compensated prediction procedure.

The predictive-signal selector 416 receives the motion-compensated signal, the intra-predicted signal, and the high-resolution estimated signal from the motion compensator 414, the intra predictor 415, and the high-resolution estimated signal generator 106, respectively. The selector 416 selects one of the received signals or performs weighting each signal and combining the weighted signals. Signal selection or composition may be done under any appropriate criteria. For example, signal selection or composition may be done so that a predictive-error signal has a smaller value in mean square. The selected (or composed) signal is then supplied as a predictive signal to the predictive-error signal generator 417 and the signal composer 421.

The predictive-error signal generator 417 receives the frame signal and the predictive signal from the frame memory-I 411 and the predictive-signal selector 416, respectively. The generator 417 subtracts the predictive signal from the frame signal to produce a predictive-error signal. The predictive-error signal is then supplied to the orthogonal-transformer and quantizer 418.

The orthogonal-transformer and quantizer 418 receives the predictive-error signal and performs an orthogonal-transforming and quantizing procedure. The orthogonal transforming may be DCT or wavelet. A further alternative is an H.264-type with combination of orthogonal-transforming and quantizing. An orthogonally-transformed and quantized signal is then supplied to the entropy encoder 419 and the inverse-quantizer and inverse-orthogonal transformer 420.

The entropy encoder 419 receives the orthogonally-transformed and quantized signal and the motion information from the orthogonal-transformer and quantizer 418 and the motion estimator 413, respectively. The, the encoder 419 applies an entropy encoding procedure to the orthogonally-transformed and quantized signal and the motion information, thus generating an output bitstream.

The inverse-quantizer and inverse-orthogonal transformer 420 receives the orthogonally-transformed and quantized signal from the orthogonal-transformer and quantizer 418, to perform an inverse-quantizing and inverse-orthogonal transforming procedure. An inverse-quantized and inverse-orthogonal transformed signal is then supplied to the signal composer 421.

The signal composer 421 receives the predictive signal and the inverse-quantized and inverse-orthogonal transformed signal from the predictive-signal selector 416 and the inverse-quantizer and inverse-orthogonal transformer 420, respectively. Then, the signal composer 421 combines the two signals to produce a decoded signal. The decoded signal is then supplied to the intra predictor 415 and the deblocking filter 422.

The deblocking filter 422 receives the decoded signal and applies a deblocking filtering procedure to the signal. The filter 422 may be an H.264 deblocking filter. The deblocking-filtered signal is supplied to the frame memory-II 412 and stored therein.

Figure 5:
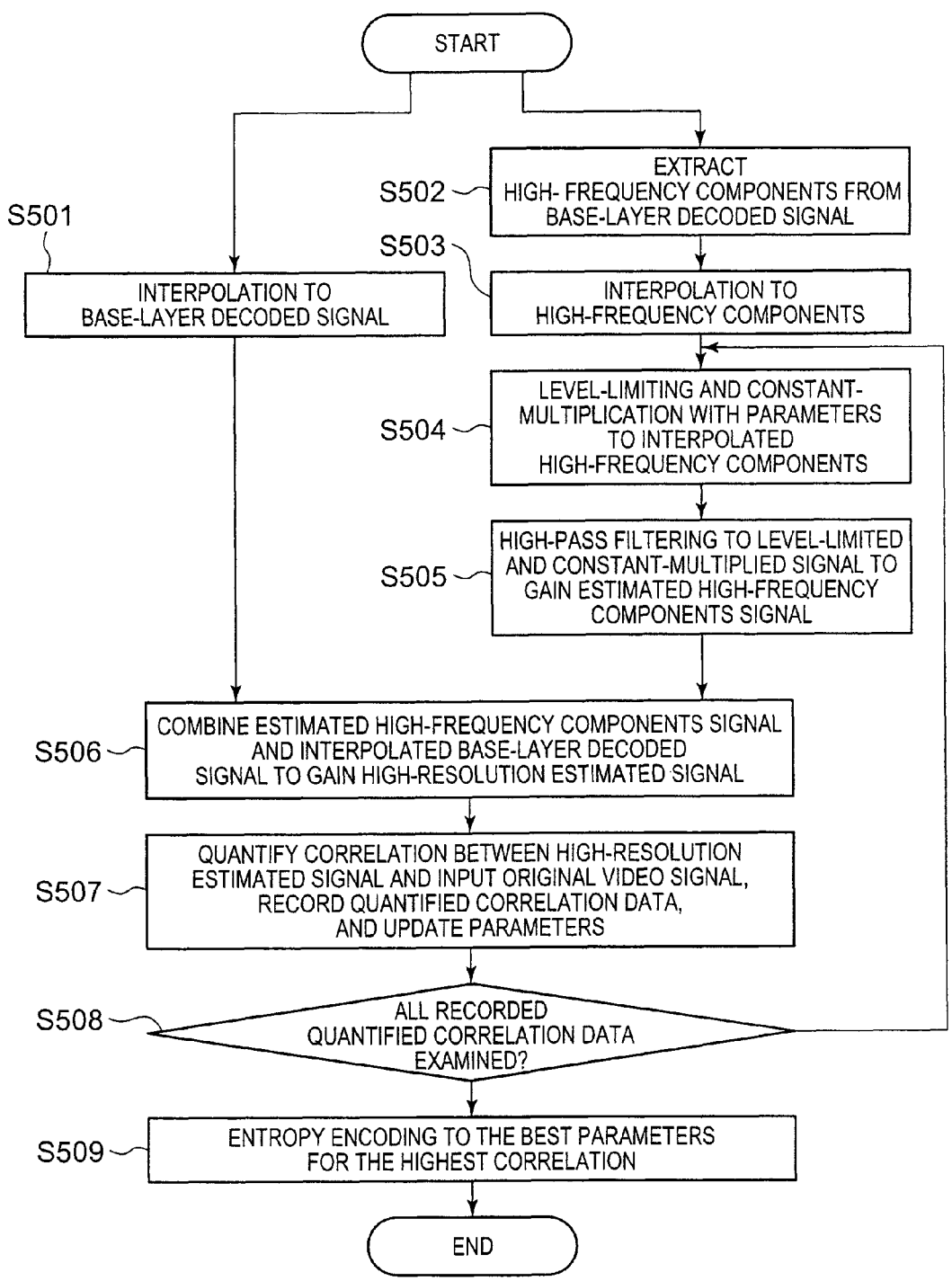
FIG. 5 shows a flowchart of a high-resolution estimated signal generation procedure that corresponds to the functions of the high-resolution estimated signal generator shown in FIG. 4.

Described next with reference to FIG. 5 is a high-resolution estimated signal generation procedure that corresponds to the several functions of the high-resolution estimated signal generator 106 and the enhancement-layer encoder 107 shown in FIG. 4.

An interpolation procedure is applied to an input base-layer decoded signal so that the signal exhibits resolution the same as the input original video signal (step S501). A high-frequency components signal is extracted from the input base-layer decoded signal (step S502). An interpolation procedure is applied to the extracted high-frequency components signal so that the high-frequency components exhibit resolution the same as the input original video signal (step S503). A level-limiting and constant-multiplication procedure is applied, with given parameters, to the interpolated high-frequency components signal (step S504). A high-pass filtering procedure is applied to a level-limited and constant-multiplied signal to gain an estimated high-frequency components signal (step S505).

The estimated high-frequency components signal and the interpolated signal gained in the step S501 are combined to obtain a high-resolution estimated signal (step S506).

The correlation between the high-resolution estimated signal and an input original video signal is quantified and the quantified correlation data is recorded (step S507). In addition, in step S507, the parameters used in the level-limiting and constant-multiplication procedure are updated.

All of the recorded quantified correlation data between the input original video signal and high-resolution estimated signals generated are examined with updated parameters to find out the best parameters that give the highest correlation (step S508). The steps S504 to S508 are repeated until the best parameters are decided. The best parameters are encoded by entropy coding (step S509).

Figure 6:
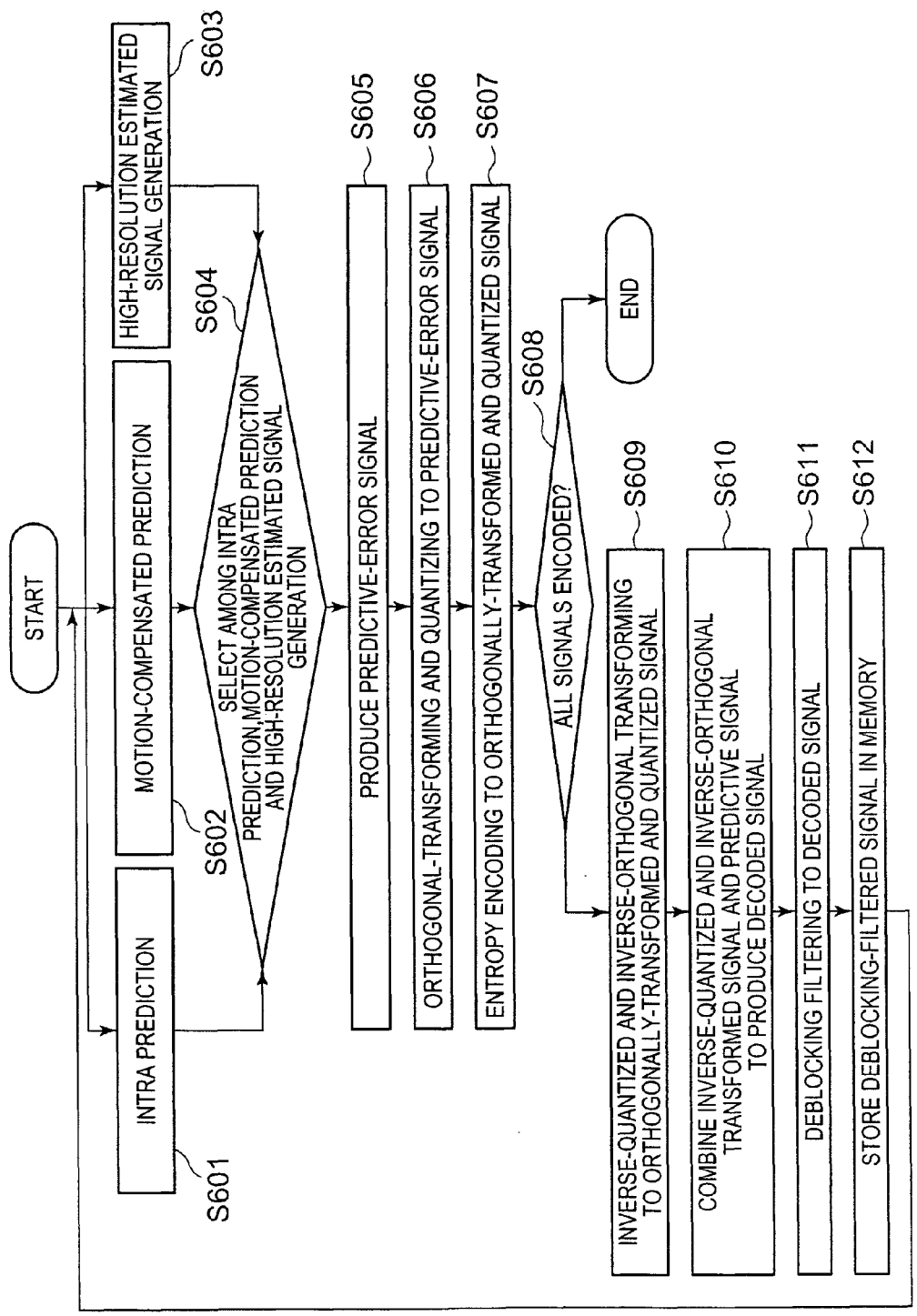
FIG. 6 shows a flowchart of an enhancement-layer encoding procedure that corresponds to the functions of the enhancement-layer encoder shown in FIG. 4.

Described next with reference to FIG. 6 is an enhancement-layer encoding procedure that corresponds to the several functions of the enhancement-layer encoder 107 shown in FIG. 4.

An intra prediction procedure is applied to a given decoded signal to gain an intra-predicted signal (step S601). A motion-compensated prediction procedure is applied to an input original video signal and a decoded signal to gain a motion-compensated signal, together with motion information gained in motion estimation (step S602). A high-resolution estimated signal is generated (step S603), through the high-resolution estimated signal generation procedure described with respect to FIG. 5.

One of the intra-predicted signal, the motion-compensated signal, and the high-resolution estimated signal is selected or each signal is weighted and combined to produce a predictive signal (step S604). The predictive signal is subtracted from the input original video signal to produce a predictive-error signal (step S605). An orthogonal-transforming and quantizing procedure is applied to the predictive-error signal (step S606). An entropy encoding procedure is applied to the orthogonally-transformed and quantized signal and also the motion information gained in step S602 (step S607).

It is determined whether all of the signals to be coded have been coded (step S608). If "YES", the enhancement-layer encoding procedure ends. If "NO", however, the following decoding and deblocking procedure is executed.

In the decoding and deblocking procedure: an inverse-quantizing and inverse-orthogonal transforming procedure is applied to the orthogonally-transformed and quantized signal gained in step S606 (step S609); the inverse-quantized and inverse-orthogonal transformed signal and the predictive signal gained in step S605 are combined to produce a decoded signal (step S610); a deblocking filtering procedure is applied to the decoded signal (step S611); and the deblocking-filtered signal is stored in a memory (step S612), like the frame memory-II 412 (FIG. 4) for the succeeding procedure (steps S601, S602 and S603).

Figure 7:
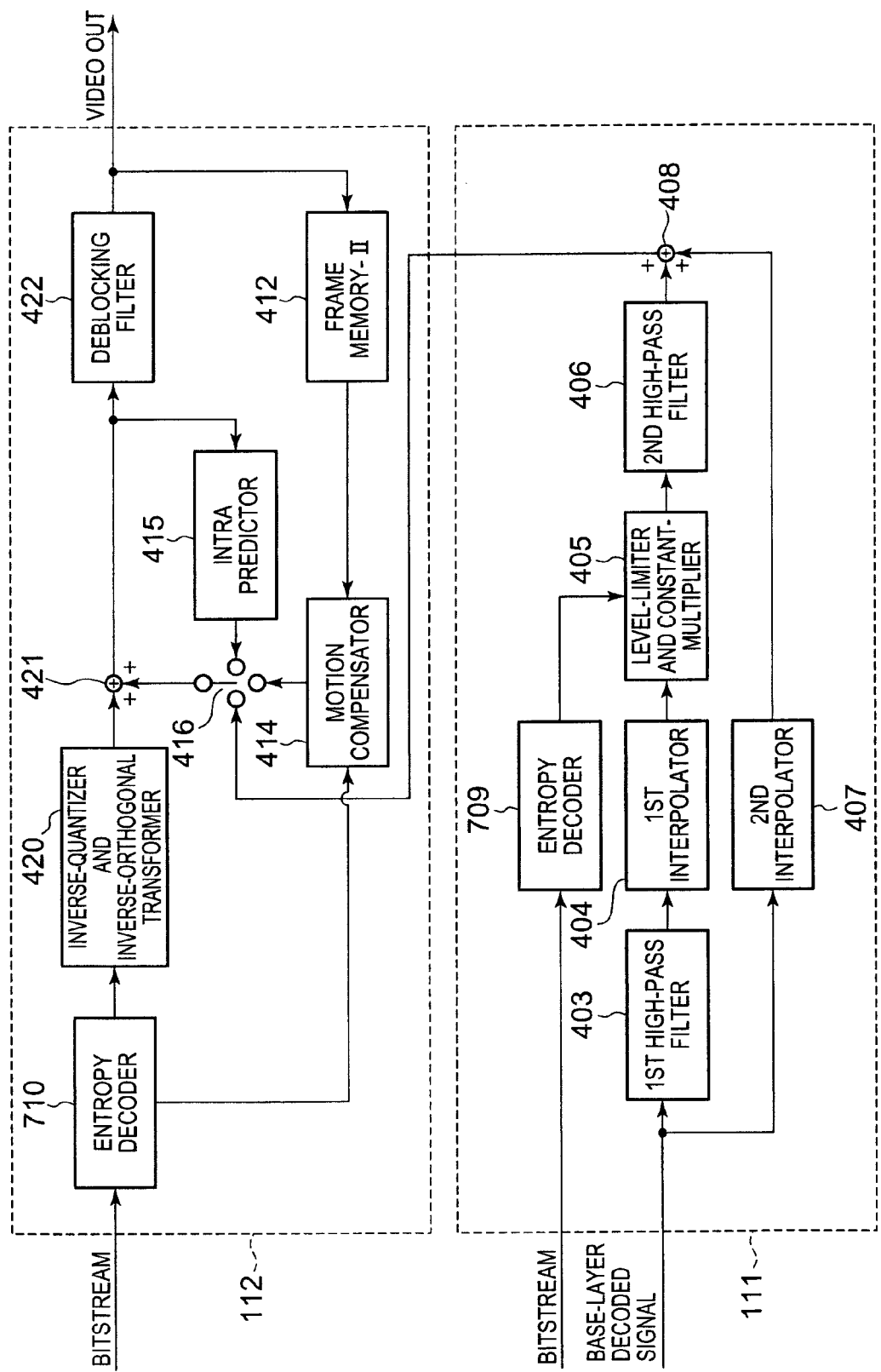
FIG. 7 shows block diagrams of an enhancement-layer decoder and a high-resolution estimated signal reconstructor of the layered decoding apparatus shown in FIG. 1.

FIG. 7 shows exemplary block diagrams of the high-resolution estimated signal reconstructor 111 and the enhancement-layer decoder 112 (FIG. 1).

The high-resolution estimated signal reconstructor 111 is equipped with, at least, a first high-pass filter 403, a first interpolator 404, a level-limiter and constant-multiplier 405, a second high-pass filter 406, a second interpolator 407, a signal composer 408, and an entropy decoder 709. The units of the reconstructor 111, besides the entropy decoder 709, are identical to the counterparts shown in FIG. 4, and hence given the same reference numerals and the detailed explanation thereof being omitted.

The entropy decoder 709 receives a bitstream from the extractor 109 (FIG. 1) and reproduces parameters carried by the bitstream, the reproduced parameters being supplied to the level-limiter and constant-multiplier 405.

The enhancement-layer decoder 112 is equipped with, at least, an entropy decoder 710, a frame memory-II 412, a motion compensator 414, an intra predictor 415, a predictive-signal selector 416, an inverse-quantizer and inverse-orthogonal transformer 420, a signal composer 421, and a deblocking filter 422. The units of the encoder 112, besides the entropy decoder 710, are identical to the counterparts shown in FIG. 4, and hence given the same reference numerals and the detailed explanation thereof being omitted.

The entropy decoder 710 receives an enhancement-layer bitstream from the extractor 109 (FIG. 1) and applies an entropy decoding procedure to the bitstream. A decoded signal and a decoded motion information are supplied to the inverse-quantizer and inverse-orthogonal transformer 420 and the motion compensator 414, respectively.

Figure 8:
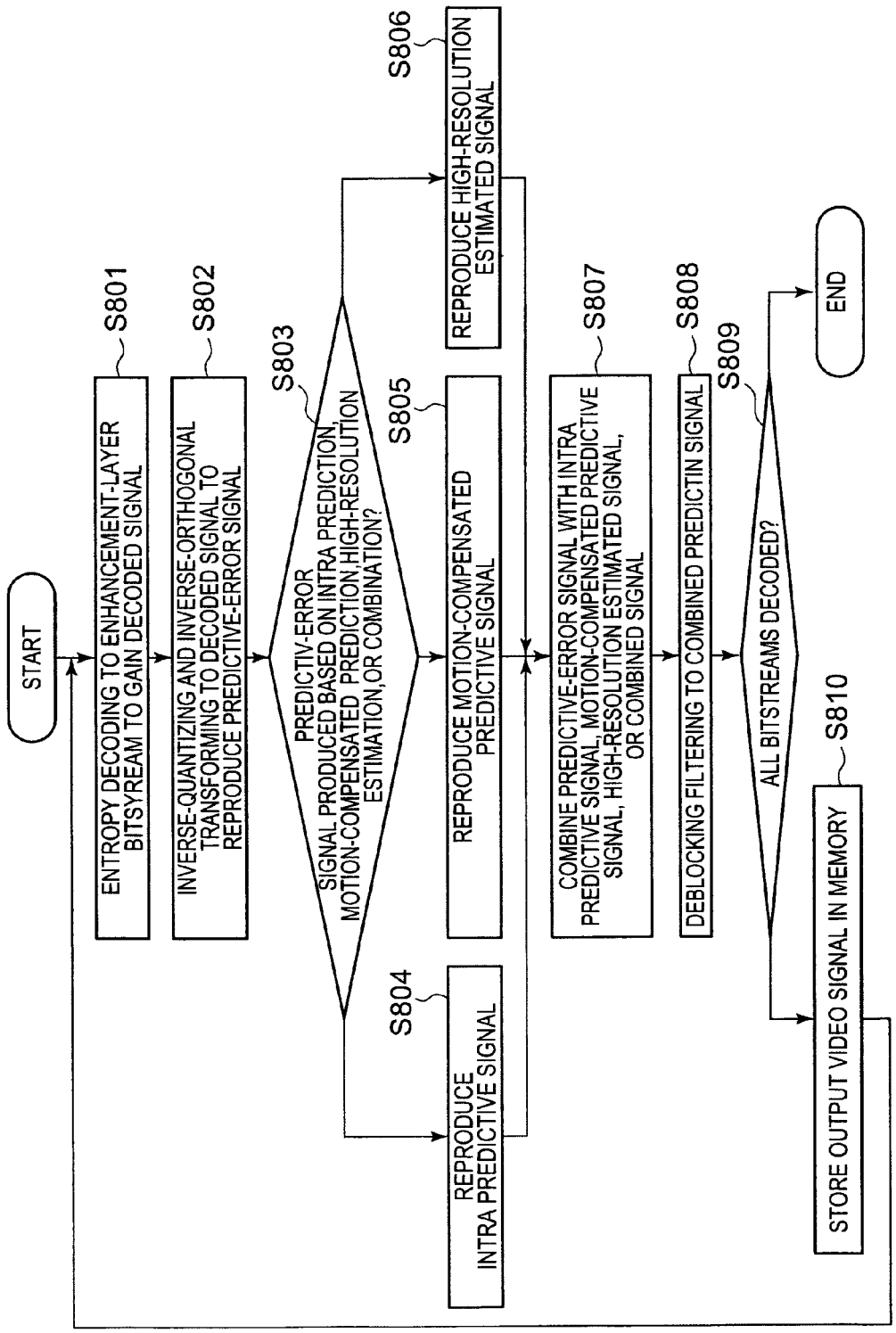
FIG. 8 shows a flowchart of an enhancement-layer decoding procedure that corresponds to the functions of the enhancement-layer decoder shown in FIG. 7.

Described next with reference to FIG. 8 is an enhancement-layer decoding procedure that corresponds to the several functions of the enhancement-layer decoder 112 shown in FIG. 7, to reproduce an enhancement-layer video signal of the same resolution as the input original video signal.

An entropy decoding procedure is applied to an input enhancement-layer bitstream to gain a decoded signal and a decoded motion information bitstream (step S801). An inverse-quantizing and inverse-orthogonal transforming procedure is applied to the decoded signal to reproduce a predictive-error signal (step S802).

It is determined whether the predictive-error signal has been produced per block based on intra prediction, motion-compensated prediction, high-resolution estimation or combination of these procedures (step S803).

When the predictive-error signal has been produced based on the intra prediction, intra prediction is performed to reproduce an intra predictive signal (step S804). When it has been produced based on the motion-compensated prediction, motion compensation is performed to reproduce a motion-compensated predictive signal (step S805). Moreover, when it has been produced based on the high-resolution estimation, a high-resolution estimated signal is reproduced (step S806), which will be described later in detail with reference to FIG. 9. In contrast, when it has been produced based on the combination of the procedures, those signals are reproduced (steps S804 to S806), then each signal is weighted and combined.

The reproduced predictive-error signal is combined with one of the intra predictive signal, the motion-compensated predictive signal, the high-resolution estimated signal, and the combined signal (step S807).

A deblocking filtering procedure is applied to the combined signal gained in step S807 (step S808) to reproduce an output video signal to be supplied to a display apparatus, etc.

The output video signal is stored in a memory, like the frame memory-II 412 (FIG. 7), as a reference frame (step S810) for a further enhancement-layer decoding procedure (steps S801 to S S810) until all of the bitstreams are decoded (step S809).

Figure 9:
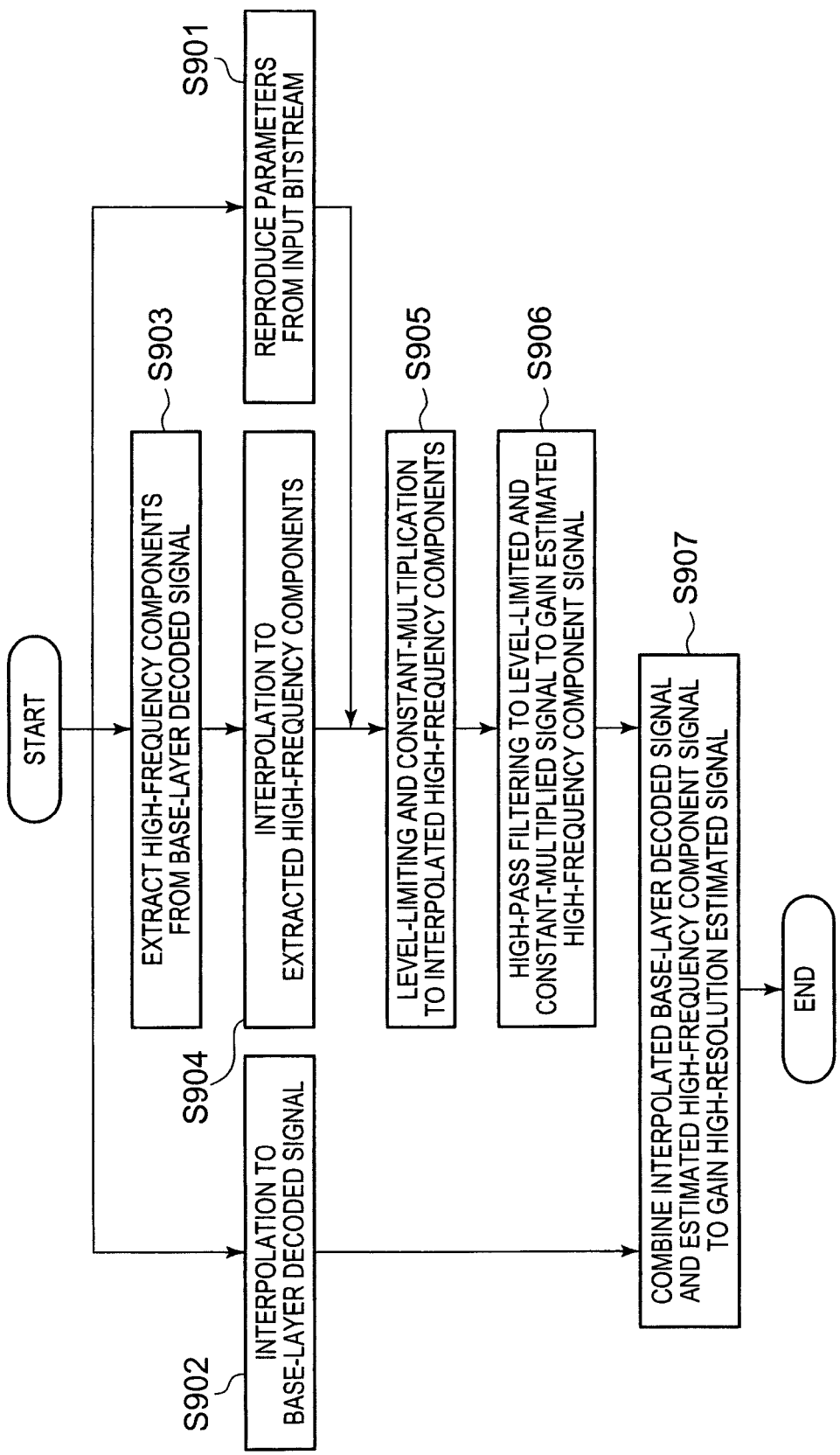
FIG. 9 shows a flowchart of a high-resolution estimated signal reconstruction procedure that corresponds to the functions of the high-resolution estimated signal reconstructor shown in FIG. 7.

Described next with reference to FIG. 9 is a high-resolution estimated signal reconstruction procedure that corresponds to the several functions of the high-resolution estimated signal reconstructor 111 shown in FIG. 7.

Parameters are reproduced from an input bitstream (step S901). An interpolation procedure is applied to an input base-layer decoded signal so that the signal exhibits resolution the same as the input original video signal (step S902). A high-frequency components are extracted from the input base-layer decoded signal (step S903).

An interpolation procedure is applied to the extracted high-frequency components so that the high-frequency components exhibit resolution the same as the input original video signal (step S904). A level-limiting and constant-multiplication procedure is applied to the interpolated signal (step S905). A high-pass filtering procedure is applied to the level-limited and constant-multiplied signal to gain an estimated high-frequency component signal (step S906).

The interpolated base-layer decoded signal and the estimated high-frequency component signal are combined to gain a high-resolution estimated signal (step S907).

The several functions of the layered coding and decoding apparatuses 101 and 103 disclosed above with reference to FIGS. 1 to 9 can be achieved with software programs according to the present invention.

Figure 10:
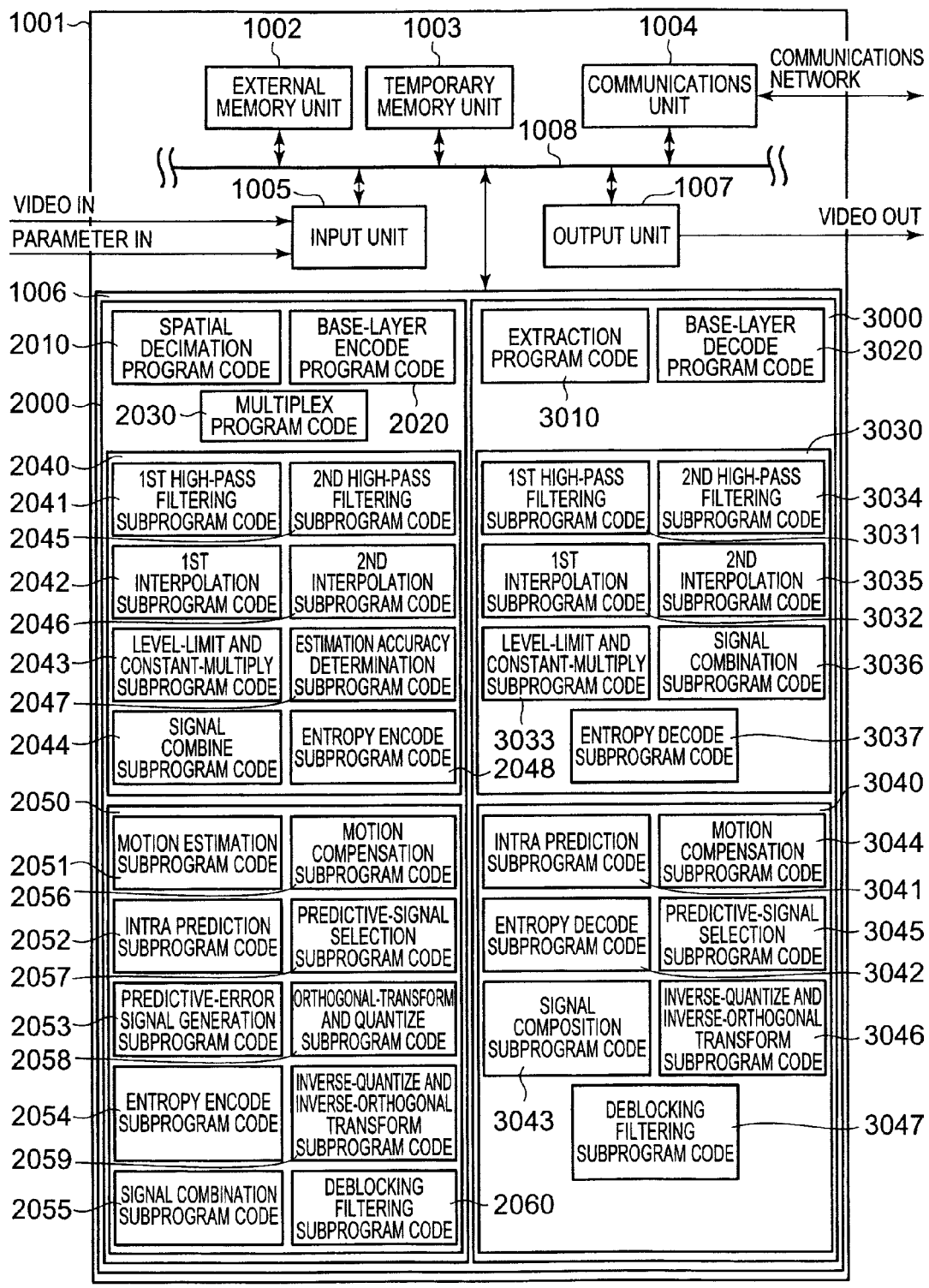
FIG. 10 shows a data processing system with software programs installed therein that correspond to the functions of the layered coding and decoding apparatuses shown in FIG. 1.

FIG. 10 shows a data processing system 1001 with software programs installed therein that correspond to the functions of the layered coding and decoding apparatuses 101 and 103 (FIG. 1).

The data processing system 1001 is equipped with: an input unit 1005 for entering several kinds of data (video signals, parameters, etc.); an output unit 1007 for outputting several kinds of data; a central and controlling processing unit 1006 with layered coding and decoding programs installed therein that correspond to the functions of the layered coding and decoding apparatuses 101 and 103; an external memory unit 1002; a temporary memory unit 1003 to be used, for example, as a working area in processing at the central processing and controlling unit 1006; and a communications unit 1004 for external communications. The units are connected to one another via a bidirectional bus 1008.

Installed in the central processing and controlling unit 1006 from a storage medium or via a communications network are a layered coding program 2000 that corresponds to the functions of the layered coding apparatus 101 and also a layered decoding program 3000 that corresponds to the functions of the layered decoding apparatus 103.

The layered coding program 2000 includes computer readable program codes, at least, a spatial decimation program code 2010, a base-layer encode program code 2020, a multiplex program code 2030, a high-resolution estimated signal generation program code 2040, and an enhancement-layer encode program code 2050.

The program codes 2010, 2020, 2030, 2040 and 2050 correspond to the functions of the spatial decimator 104, the base-layer encoder 105, the multiplexer 108, the high-resolution estimated signal generator 106, and the enhancement-layer encoder 107, respectively, shown in FIG. 1.

The high-resolution estimated signal generation program code 2040 includes a first high-pass filtering subprogram code 2041, a first interpolation subprogram code 2042, a level-limit and constant-multiply subprogram code 2043, a signal combine subprogram code 2044, a second high-pass filtering subprogram code 2045, a second interpolation subprogram code 2046, an estimation accuracy determination subprogram code 2047, and an entropy encode subprogram code 2048.

The subprogram codes 2041, 2042, 2043, 2044, 2045, 2046, 2047, and 2048 correspond to the functions of the first high-pass filter 403, the first interpolator 404, the level-limiter and constant-multiplier 405, the signal composer 408, the second high-pass filter 406, the second interpolator 407, the estimation accuracy determiner 409, and the entropy encoder 410, respectively, shown in FIG. 4.

The enhancement-layer encode program code 2050 includes a motion estimation subprogram code 2051, an intra prediction subprogram code 2052, a predictive-error signal generation subprogram code 2053, an entropy encode subprogram code 2054, a signal combination subprogram code 2055, a motion compensation subprogram code 2056, a predictive-signal selection subprogram code 2057, an orthogonal-transform and quantize subprogram code 2058, an inverse-quantize and inverse-orthogonal transform subprogram code 2059, and a deblocking filtering subprogram code 2060.

The subprogram codes 2051, 2052, 2053, 2054, 2055, 2056, 2057, 2058, 2059, and 2060 correspond to the functions of the motion estimator 413, the intra predictor 415, the predictive-error signal generator 417, the entropy encoder 419, the signal composer 421, the motion compensator 414, the predictive-signal selector 416, the orthogonal-transformer and quantizer 418, the inverse-quantizer and inverse-orthogonal transformer 420, and the deblocking filter 422, respectively, shown in FIG. 4.

The layered decoding program 3000 includes computer readable program codes, at least, an extraction (a separation) program code 3010, a base-layer decode (first decode) program code 3020, a high-resolution estimated signal reconstruction program code 3030, and an enhancement-layer decode program code 3040.

The program codes 3010, 3020, 3030, and 3040 correspond to the functions of the extractor (separator) 109, the base-layer decoder (first decoder) 110, the high-resolution estimated signal reconstructor 111, and the enhancement-layer decoder 112 (second decoder), respectively, shown in FIG. 1.

The high-resolution estimated signal reconstruction program code 3030 includes a first high-pass filtering subprogram code 3031, a first interpolation subprogram code 3032, a level-limit and constant-multiply subprogram code 3033, a second high-pass filtering subprogram code 3034, a second interpolation subprogram code 3035, a signal combination subprogram code 3036, and an entropy decode subprogram code 3037.

The subprogram codes 3031, 3032, 3033, 3034, 3035, 3036, and 3037 correspond to the functions of the first high-pass filter 403, the first interpolator 404, the level-limiter and constant-multiplier 405, the second high-pass filter 406, the second interpolator 407, the signal composer 408, and the entropy decoder 709, respectively, shown in FIG. 7.

The enhancement-layer encode program code 3040 includes an intra prediction subprogram code 3041, an entropy decode subprogram code 3042, a signal composition subprogram code 3043, a motion compensation subprogram code 3044, a predictive-signal selection subprogram code 3045, an inverse-quantize and inverse-orthogonal transform subprogram code 3046, and a deblocking filtering subprogram code 3047.

The subprogram codes 3041, 3042, 3043, 3044, 3045, 3046, and 3047 correspond to the functions of the intra predictor 415, the entropy decoder 710, the signal composer 421, the motion compensator 414, the predictive-signal selector 416, the inverse-quantizer and inverse-orthogonal transformer 420, and the deblocking filter 422, respectively, shown in FIG. 7.

Disclosed next are a variation to the high-resolution estimated signal generator 106 in the layered coding apparatus 101 and also a variation to the high-resolution estimated signal reconstructor 111 in the layered decoding apparatus 103, shown in FIG. 1, according to the present invention.

The variations give a reverse order to the extraction of high-frequency components and the interpolation in the layered coding apparatus 101 and the layered decoding apparatus 103, shown in FIG. 1, which require smaller memory capacity, smaller amount of processing, etc., for the same advantages as given in FIG. 1. In detail, in FIG. 1, high-frequency components are extracted from a base-layer decoded signal and then the extracted components and the decoded signal are both subjected to interpolation. In contrast, in the variations, a base-layer decoded signal is subjected to interpolation and then high-frequency components are extracted from the interpolated signal for smaller memory capacity, smaller amount of processing. A linear procedure for both extraction and interpolation and extraction of high-frequency components give substantially the same results to the embodiment in FIG. 1 and the variations even though the order of extraction and interpolation is reverse. The variations perform filtering after interpolation that is a filtering procedure to a sampling-frequency-changed signal.

Figure 11:
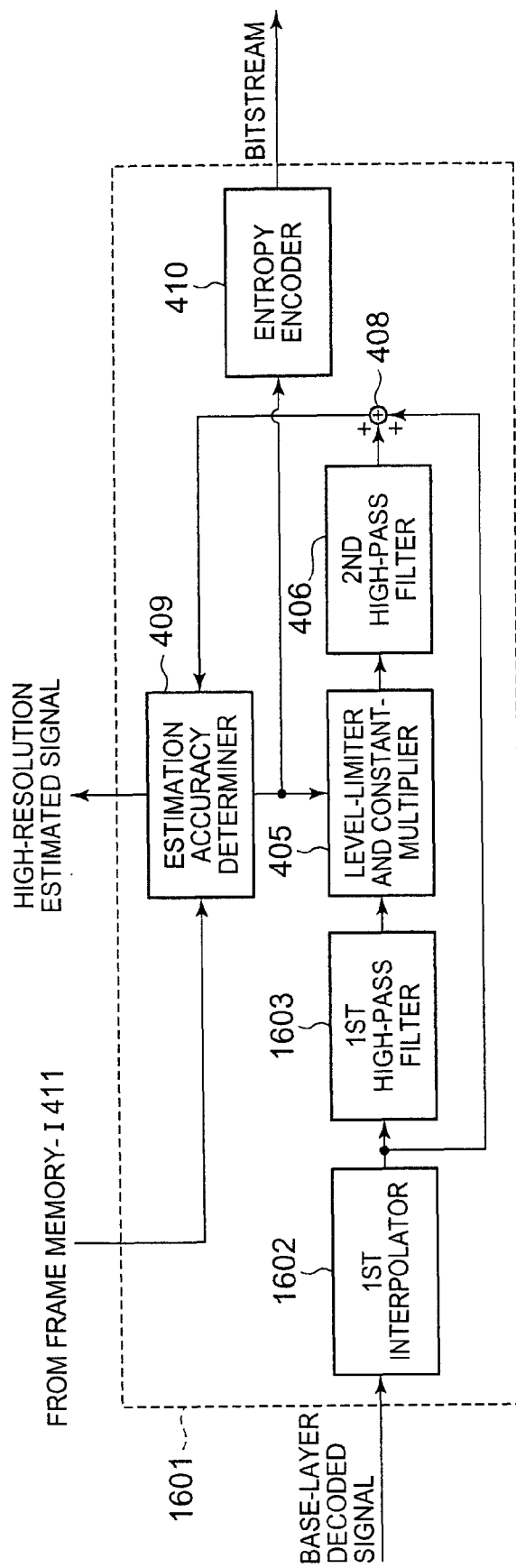
FIG. 11 shows a block diagram of a variation to the high-resolution estimated signal generator shown in FIG. 1.

FIG. 11 shows a block diagram of a high-resolution estimated signal generator 1601 that is a variation to the high-resolution estimated signal generator 106 in FIG. 1.

The high-resolution estimated signal generator 1601 is equipped with, at least, a first interpolator 1602, a first high-pass filter 1603, a level-limiter and constant-multiplier 405, a second high-pass filter 406, a signal composer 408, an estimation accuracy determiner 409, and an entropy encoder 410. The units of the generator 1601, besides the interpolator 1602 and the high-pass filter 1603, are identical to the counterparts shown in FIG. 4, and hence given the same reference numerals and the detailed explanation thereof being omitted.

The first interpolator 1602, receives the base-layer decoded signal supplied from the base-layer encoder 105 (FIG. 1). The interpolator 1602 applies an interpolation procedure to the base-layer decoded signal so that the decoded signal exhibits resolution the same as the input original video signal, for example, according to the expression (8) described above. The filter coefficients, interpolation function, etc., may be different from those in the expression (8). The interpolated base-layer decoded signal is then supplied to the first high-pass filter 1603.

The first high-pass filter 1603 receives the interpolated base-layer decoded signal supplied from the first interpolator 1602 and extracts high-frequency components, for example, according to the expressions (1) and (2) described above. The signal input to the high-pass filter 1603 exhibits higher resolution due to interpolation so that it requires a higher sampling frequency when filtered based on a corresponding bandwidth in the expression (2). For example, an enlargement scale factor of 2 requires a bandwidth in the expression (2) ½ times that in the embodiment shown in FIG. 1. One preferable requirement for the first high-pass filter 1603 is that the filter coefficients and interpolation function, etc., of the filter 1603 satisfy the pyramid structure with those of the spatial decimator 104 (FIG. 1), the first interpolator 1602, the second high-pass filter 406.

Figure 12:
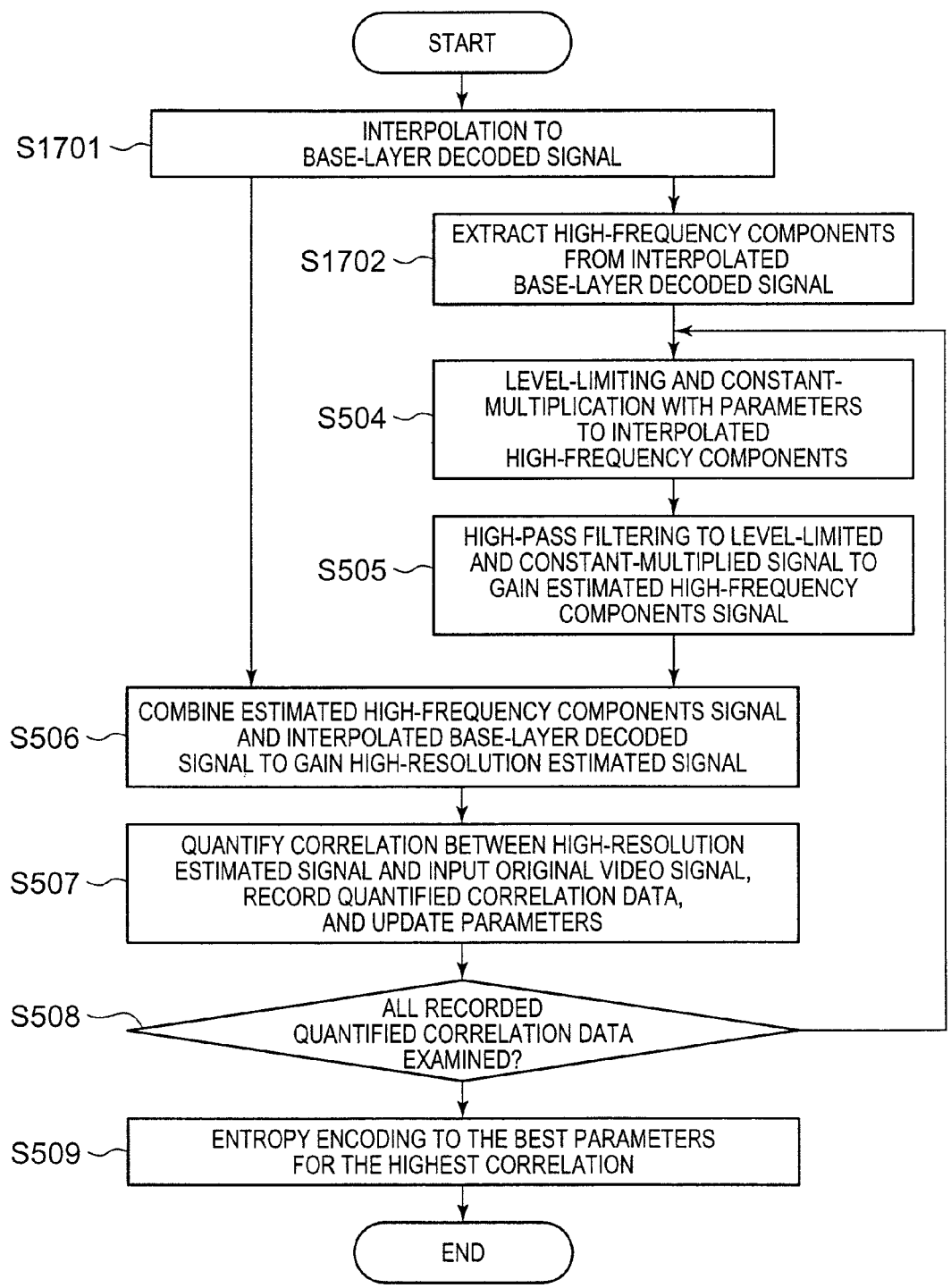
FIG. 12 shows a flowchart of a high-resolution estimated signal generation procedure that corresponds to the functions of the high-resolution estimated signal generator shown in FIG. 11.

Described next with reference to FIG. 12 is a high-resolution estimated signal generation procedure that corresponds to the several functions of the high-resolution estimated signal generator 1601 shown in FIG. 11. In FIG. 17, the steps identical to those in FIG. 5 are given the same step numbers.

An interpolation procedure is applied to an input base-layer decoded signal so that the signal exhibits resolution the same as an input original video signal (step S1701). High-frequency components are extracted from the interpolated base-layer decoded signal (step S1702).

The succeeding procedures are the same as those described with reference to FIG. 5 to generate a high-resolution estimated signal.

Figure 13:
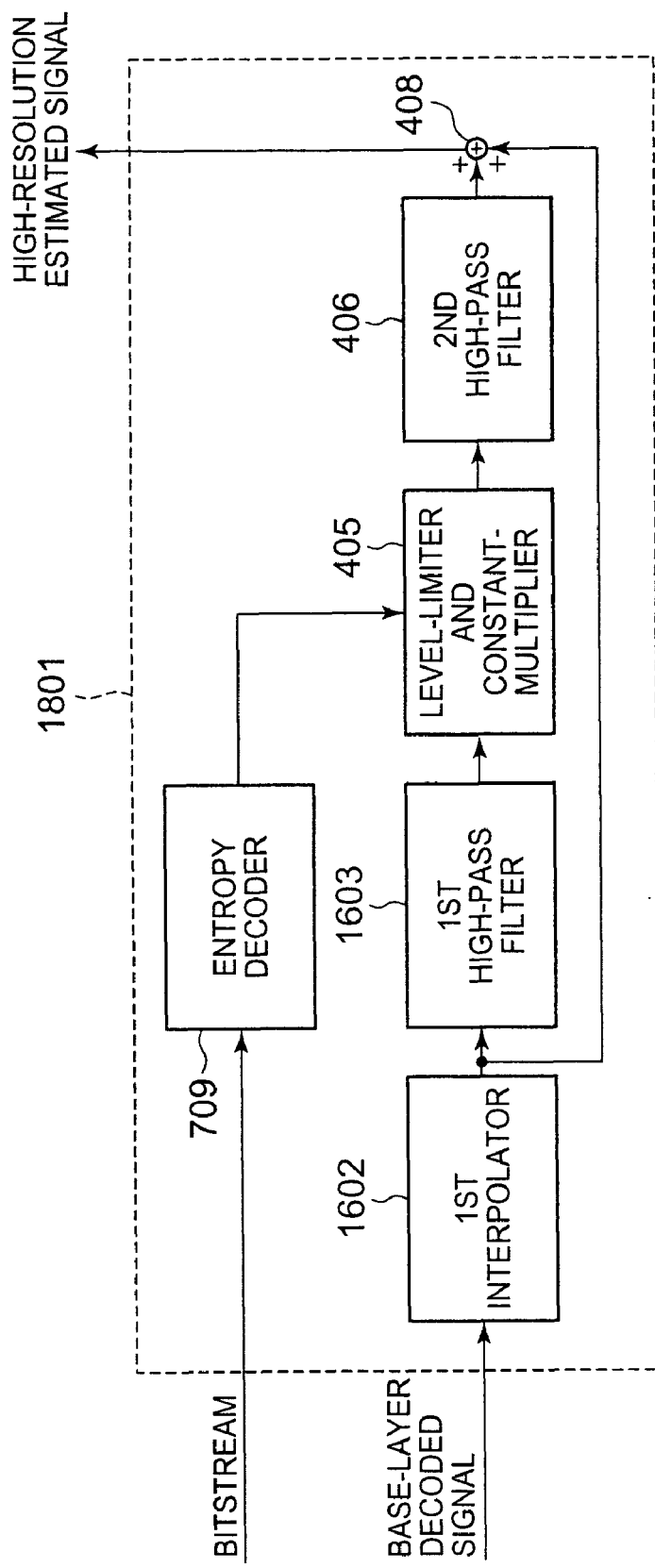
FIG. 13 shows a block diagram of a variation to the high-resolution estimated signal reconstructor shown in FIG. 1.

FIG. 13 shows a block diagram of a high-resolution estimated signal reconstructor 1801 that is a variation to the high-resolution estimated signal reconstructor 111 in FIG. 1.

The high-resolution estimated signal reconstructor 1801 is equipped with, at least, a first interpolator 1602, a first high-pass filter 1603, a level-limiter and constant-multiplier 405, a second high-pass filter 406, a signal composer 408, and an entropy decoder 709. These units are identical to the counterparts shown in FIGS. 4, 7 and 11, and hence given the same reference numerals and the explanation thereof being omitted.

Figure 14:
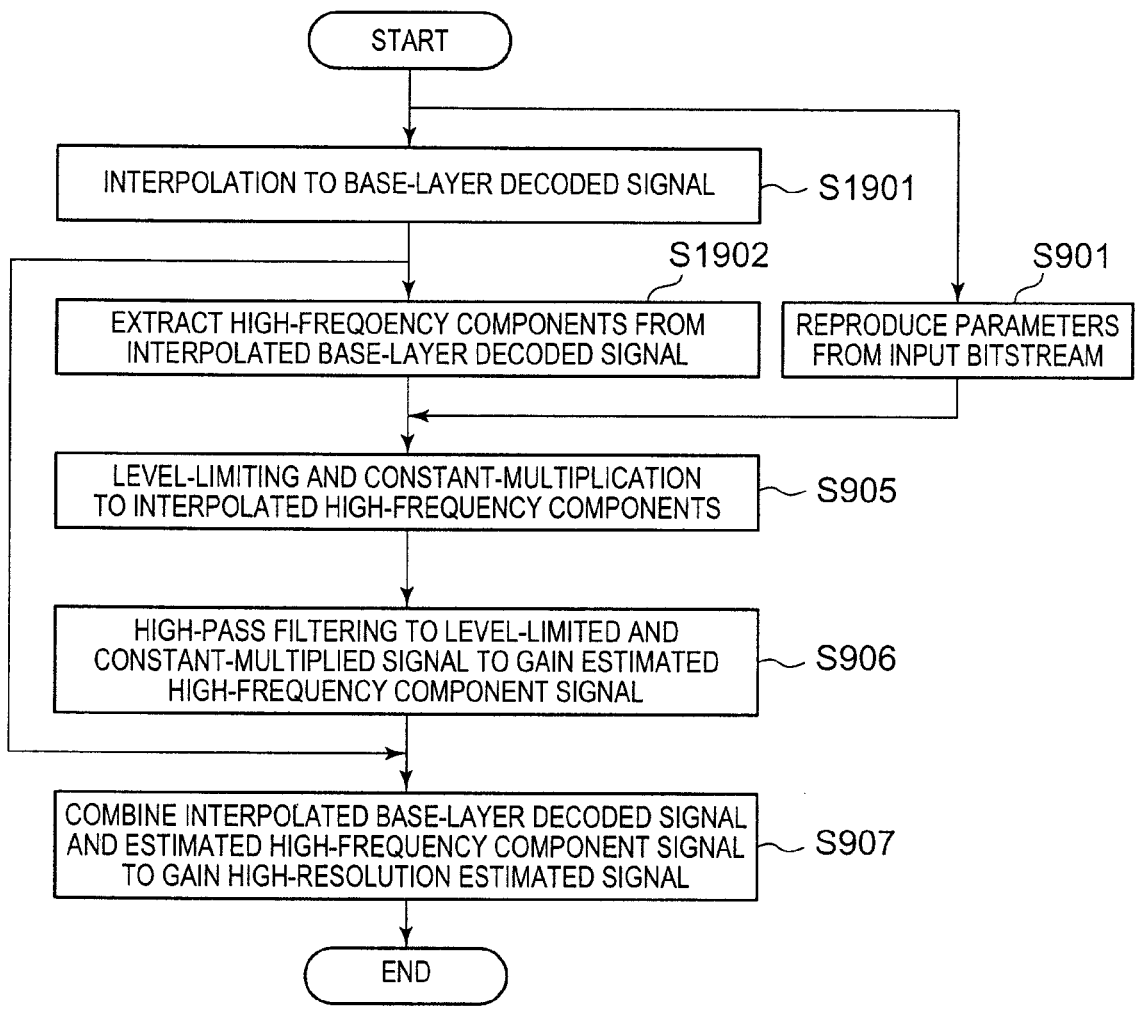
FIG. 14 shows a flowchart for a high-resolution estimated signal reconstruction procedure that corresponds to the functions of the high-resolution estimated signal reconstructor shown in FIG. 13.

Described next with reference to FIG. 14 is a high-resolution estimated signal reconstruction procedure that corresponds to the several functions of the high-resolution estimated signal reconstructor 1801 shown in FIG. 13. In FIG. 14, the steps identical to those in FIG. 9 are given the same step numbers and the explanation thereof being omitted.

Parameters are reproduced from an input bitstream (step S901). An interpolation procedure is applied to an input base-layer decoded signal so that the signal exhibits resolution the same as an input original video signal (step S1901). High-frequency components are extracted from the interpolated base-layer decoded signal (step S1902).

The succeeding procedures are the same as those described with reference to FIG. 9 to reconstruct a high-resolution estimated signal.

By the way, in the described examples of the video-signal layered coding apparatus 101, both the high-resolution estimated signal generator 106 and the enhancement-layer encoder 107 have the entropy encoder 410 and 419, respectively. However, the apparatus allows omitting the entropy encoder 410 of the high-resolution estimated signal generator 106. In this case, the parameters for generating the high-resolution estimated signal are sent to the entropy encoder 419 of the enhancement-layer encoder 107, and then are coded (corresponding procedure is step S509).

As same as the video-signal layered coding apparatus 101, the video-signal layered decoding apparatus 103 also allows omitting the entropy decoder 709 of the high-resolution estimated signal reconstructor 111. In this case, the coded parameters for reconstructing the high-resolution estimated signal are decoded by the entropy decoder 710 of the enhancement-layer decoder 112 (corresponding procedure is step S901), and then are sent to the level-limiter and constant-multiplier 405 of the high-resolution estimated signal reconstructor 111.

As disclosed above in detail, the present invention produces predictive signals with an accurate high-resolution applying procedure in addition to interpolation to produce smaller interlayer predictive errors, thus achieving higher-quality layered coding and decoding.

Moreover, the present invention produces predictive signals (based on low-resolution signals) which are closer to input high-resolution video signals, with reference to the input signals, thus achieving highly-efficient layered coding and decoding with an enhanced high-resolution applying procedure.

What is claimed is:

1. A video-signal layered coding apparatus for encoding an input video signal at a plurality of coding layers exhibiting different spatial resolutions, the apparatus comprising at each coding layer:
    a spatial down-scaler to spatially scale down an input video signal into a resolution-lowered video signal that exhibits a resolution lower than the input video signal;
    a first encoder to encode the resolution-lowered video signal with a decoding procedure, thus obtaining first coded data and a first decoded signal;
    a spatial up-scaler to perform a high-resolution procedure by extracting a first high-frequency components signal from the first decoded signal, spatially scaling up the first high-frequency components signal so that the first high-frequency components signal exhibits resolution the same as the input original video signal, applying a level-limiting and constant-multiplication procedure with parameters to the spatial scaled-up first high-frequency components signal to generate a second high-frequency components signal, and adding the first and second high-frequency components signals to each other, thus obtaining a high-resolution scaled-up video signal, the parameters used for the level-limiting and constant-multiplication procedure being updated with comparison between the input video signal and the high-resolution scale-up video signal, the generation of the high-resolution scaled-up video signal and the comparison being repeated until a result of the comparison meets a specific requirement to obtain final parameters for the level-limiting and constant-multiplication procedure which are encoded to obtain coded parameters, and to obtain a final high-resolution scaled-up video signal;

a second encoder to perform inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal, the spatial predictive signal and the temporal predictive signal and combining the weighted signals, to generate an inter-spatial resolution predictive signal at the resolution of the input video signal, and subtracting the inter-spatial resolution predictive signal from the input video signal, thus obtaining second coded data that exhibits a resolution higher than the resolution-lowered video signals; and a multiplexer to multiplex the first and second coded data and the coded parameters into a bitstream.

2. A video-signal layered coding method of encoding an input video signal at a plurality of coding layers exhibiting different spatial resolutions, the method comprising at each coding layer:

a spatial scaling-down step of spatially scaling down an input video signal into a resolution-lowered video signal that exhibits a resolution lower than the input video signal;

a first encoding step of encoding the resolution-lowered video signal with a decoding procedure, thus obtaining first coded data and a first decoded signal;

a spatial scaling-up step of performing a high-resolution procedure by extracting a first high-frequency components signal from the first decoded signal, spatially scaling up the first high-frequency components signal so that the first high-frequency components signal exhibits resolution the same as the input original video signal, applying a level-limiting and constant-multiplication procedure with parameters to the spatially scaled-up first high-frequency components signal to generate a second high-frequency components signal, and adding the first and second high-frequency components signals to each other, thus obtaining a high-resolution scaled-up video signal, the parameters used for the level-limiting an constant-multiplication procedure being updated with comparison between the input video signal and the high-resolution scaled-up video signal, the generation of the high resolution scaled-up video signal and the comparison being repeated until a result of the comparison meets a specific requirement to obtain final parameters for the level-limiting and constant-multiplication procedure which are encoded to obtain coded parameters, and to obtain a final high-resolution scaled-up video signal;

a second encoding step of performing inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal, the spatial predictive signal and the temporal predictive signal and combining the weighted signals, to generate an inter-spatial resolution predictive signal at the resolution of the input video signal, and subtracting the inter-spatial resolution predictive signal from the input video signal, thus obtaining second coded data that exhibits a resolution higher than the resolution-lowered video signal; and multiplexing the first and second coded data and the coded parameters into a bitstream.

3. A video-signal layered coding program, encoded on a non-transitory computer readable medium, for encoding an input video signal at a plurality of coding layers exhibiting different spatial resolutions, the program comprising at each coding layer:

a spatial scaling-down program code of spatially scaling down an input video signal into a resolution-lowered video signal that exhibits a resolution lower than the input video signal;

a first encoding program code of encoding the resolution-lowered video signal with a decoding procedure, thus obtaining first coded data and a first decoded signal;

a spatial scaling-up program code of performing a high-resolution procedure by extracting a first high-frequency components signal from the first decoded signal, spatially scaling up the first high-frequency components signal so that the first high-frequency components signal exhibits resolution the same as the input original video signal, applying a level-limiting and constant-multiplication procedure with parameters to the spatially scaled-up first high-frequency components signal to generate a second high-frequency components signal, and adding the first and second high-frequency components signal to each other, thus obtaining a high-resolution scaled-up video signal, the parameters used for the level-limiting and constant-multiplication procedure being updated with comparison between the input video signal and the high resolution scaled-up video signal, the generation of the high-resolution scaled-up video signal and the comparison being repeated until a result of the comparison meets a specific requirement to obtain final parameters for the level-limiting and constant-multiplication procedure which are encoded to obtain coded parameters, and to obtain a final high-resolution scaled-up video signal;

a second encoding program code of performing inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal, the spatial predictive signal and the temporal predictive signal and combining the weighted signals, to generate an inter-spatial resolution predictive signal at the resolution of the input video signal, and subtracting the inter-spatial resolution predictive signal from the input video signal, thus obtaining second coded data that exhibits a resolution higher than the resolution-lowered video signal; and a multiplexing code of multiplexing the first and second coded data and the coded parameters into a bitstream.

4. A video-signal layered decoding apparatus for decoding an input bitstream at a plurality of decoding layers exhibiting different spatial resolutions, the apparatus comprising at each decoding layer:
a separator to separate an input bitstream into first coded data, second coded data and third coded data, wherein
the first coded data is an encoded version of a resolution-lowered video signal exhibiting a resolution lower than an original video signal and obtained by spatially scaling down the original video signal,
the second coded data is a high-resolution scaled-up video signal obtained through a high-resolution procedure by extracting a first high-frequency components signal from a first decoded signal obtained by decoding the resolution-lowered video signal, spatially scaling up the first high-frequency components signal so that the first high-frequency components signal exhibits resolution the same as the original video signal, applying a level-limiting and constant-multiplication procedure with parameters to the spatially scaled up first high-frequency components signal to generate a second high-frequency components signal, and adding the first and second high-frequency components signals to other, thus obtaining a high-resolution scaled-up video signal, the parameters used for the level-limiting and constant-multiplication procedure being updated with comparison between the video signal and the high-resolution scaled-up video signal, the generation of the high-resolution scaled-up video signal and the comparison being repeated until a result of the comparison meets a specific requirement to obtain final parameters for the level-limiting and constant-multiplication procedure, and to obtain a final high-resolution scaled-up video signal, followed by inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal, the spatial predictive signal and the temporal predictive signal and combining the weighted signals, to generate an inter-spatial resolution predictive signal at the resolution of the original video signal, and subtracting the inter-spatial resolution predictive signal from the original video signal, thus obtaining second coded data that exhibits a resolution higher than the resolution-lowered video signal, and
the third coded data is the coded parameters obtained by encoding the final parameters for the level-limiting and constant-multiplication procedure;
a first decoder to decode the separated first coded data to obtain a resolution-lowered first decoded signal;
a reconstructor to decode the separated coded third data to reconstruct the parameters used for the level-limiting and constant-multiplication procedure and spatially scale up a third high-frequency components signal extracted from the first decoded signal so that the third high-frequency components signal exhibits resolution the same as the original video signal, followed by applying a level-limiting and constant-multiplication procedure to the scaled-up third high-frequency components signal using the reconstructed parameters to obtain a fourth high-frequency components signal and adding the fourth high-frequency components signal and a second decoded signal obtained by scaling up the first decoded signal so that the first decoded signal exhibits resolution the same as the original video signal to reconstruct a high-resolution scaled-up video signal; and
a second decoder to decode the separated second coded data to obtain a decoded predictive-error signal, reconstruct a predictive signal through inter-spatial resolution prediction using the reconstructed high-resolution scaled-up video signal as a predictive signal, and add the reconstructed predictive signal and the decoded predictive-error signal, thus obtaining a decoded signal of the same resolution as the original video signal.

5. A video-signal layered decoding method of decoding an input bitstream at a plurality of decoding layers exhibiting different spatial resolutions, the method comprising at each decoding layer:
a separating step of separating an input bitstream into first coded data, second coded data and third coded data, wherein
the first coded data is an encoded version of a resolution-lowered video signal exhibiting a resolution lower than an original video signal and obtained by spatially scaling down the original video signal,
the second coded data is a high-resolution scaled-up video signal obtained through a high-resolution procedure by extracting a first high-frequency components signal from a first decoded signal obtained by decoding the resolution-lowered video signal, spatially scaling up the first high-frequency components signal so that the first high-frequency components signal exhibits resolution the same as the original video signal, applying a level-limiting and constant-multiplication procedure with parameters to the spatially scaled-up first high-frequency components signal to generate a second high-frequency components signal, and adding the first and second high-frequency components signals to each other, thus obtaining a high-resolution scaled-up video signal, the parameters used for the level-limiting and constant-multiplication procedure being updated with comparison between the video signal and the high-resolution scaled-up video signal, the generation of the high-resolution scaled-up video signal and the comparison being repeated until a result of the comparison meets a specific requirement to obtain final parameters for the level-limiting and constant-multiplication procedure, and to obtain a final high-resolution scaled-up video signal, followed by inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal, the spatial predictive signal and the temporal predictive signal and combining the weighted signals, to generate an inter-spatial resolution predictive signal at the resolution of the original video signal, and subtracting the inter-spatial resolution predictive signal from the original video signal, thus obtaining second coded data that exhibits a resolution higher than the resolution-lowered video signal, and
the third, coded data is the coded parameters obtained by encoding the final parameters for the level-limiting and constant-multiplication procedure;

a first decoding step of decoding the separated first coded data to obtain a resolution-lowered first decoded signal;

a reconstructing step of decoding the separated coded third data to reconstruct the parameters used for the level-limiting and constant-multiplication procedure and spatially scale up a third high-frequency components signal extracted from the first decoded signal so that the third high-frequency components signal exhibits resolution the same as the original video signal, followed by applying a level-limiting and constant-multiplication procedure to the scaled up third high-frequency components signal using the reconstructed parameters to obtain a fourth high-frequency components signal and adding the fourth high-frequency components signal and a second decoded signal obtained by scaling up the first decoded signal so that the first decoded signal exhibits resolution the same as the original video signal to reconstruct a high-resolution scaled-up video signal; and a second decoding step of decoding the separated second coded data to obtain a decoded predictive-error signal, reconstruct a predictive signal through inter-spatial resolution prediction using the reconstructed high-resolution scaled-up video signal as a predictive signal, and add the reconstructed predictive signal and the decoded predictive-error signal, thus obtaining a decoded signal of the same resolution as the original video signal.

6. A video-signal layered decoding program, encoded on a non-transitory computer readable medium, for decoding an input bitstream at a plurality of decoding layers exhibiting different spatial resolutions, the program comprising at each decoding layer:

a separating program code of separating an input bitstream into first coded data, second coded data and third coded data, wherein the first coded data is an encoded version of a resolution-lowered video signal exhibiting a resolution lower than an original video signal and obtained by spatially scaling down the original video signal, the second coded data is a high-resolution scaled-up video signal obtained through a high-resolution procedure by extracting a first high-frequency components signal from a first decoded signal obtained by decoding the resolution-lowered video signal, spatially scaling up the first high-frequency components signal so that the first high-frequency components signal exhibits resolution the same as the original video signal, applying a level-limiting and constant-multiplication procedure with parameters to the spatially scaled-up first high-frequency components signal to generate a second high-frequency components signal, and adding the first and second high-frequency components signals to each other, thus obtaining a high-resolution scaled-up video signal, the parameters used for the level-limiting and constant-multiplication procedure being updated with comparison between the video signal and the high-resolution scaled-up video signal, the generation of the high-resolution scaled-up video signal and the comparison being repeated until a result of the comparison meets a specific requirement to obtain final parameters for the level-limiting and constant-multiplication procedure and to obtain a final high-resolution scaled-up video signal, followed by inter-spatial resolution prediction using the final high-resolution scaled-up video signal as a predictive signal generated based on the resolution-lowered video signal, with spatial and temporal prediction to obtain a spatial predictive signal and a temporal predictive signal, respectively, at the resolution of the input video signal, followed by selecting one among the predictive signal, the spatial predictive signal and the temporal predictive signal or by weighting the predictive signal the spatial predictive signal and the temporal predictive signal and combining the weighted signals, to generate an inter-spatial resolution predictive signal at the resolution of the video signal, and subtracting the inter-spatial resolution predictive signal from the original video signal, thus obtaining second coded data that exhibits a resolution higher than the resolution-lowered video signal, and the third coded data is the coded parameters obtained by encoding the final parameters for the level-limiting and constant-multiplication procedure;

a first decoding program code of decoding the separated first coded data to obtain a resolution-lowered first decoded signal;

a reconstructing program code of decoding the separated first coded third data to reconstruct the parameters used for the level-limiting and constant-multiplication procedure and spatially scale up a third high-frequency components signal extracted from the first decoded signal so that the third high-frequency components signal exhibits resolution the same as the original video signal, followed by applying a level-limiting and constant-multiplication procedure to the scaled-up third high-frequency components signal using the reconstructed parameters to obtain a fourth high-frequency components signal and adding the fourth high-frequency components signal and a second decoded signal obtained by scaling up the first decoded signal so that the first decoded signal exhibits resolution the same as the original video signal to reconstruct a high-resolution scaled-up video signal; and a second program code of decoding the separated second coded data to obtain a decoded predictive-error signal, reconstruct a predictive signal through inter-spatial resolution prediction using the reconstructed high resolution scaled-up video signal as a predictive signal, and add the reconstructed predictive signal and the decoded predictive-error signal, thus obtaining a decoded signal of the same resolution as the original video signal.

* * * * *